United States Patent [19]

Petersen

[11] Patent Number: 5,874,796
[45] Date of Patent: *Feb. 23, 1999

[54] PERMANENT MAGNET D.C. MOTOR HAVING A RADIALLY-DISPOSED WORKING FLUX GAP

[76] Inventor: Christian C. Petersen, 29 Hope Ave., Pocasset, Mass. 02559

[*] Notice: The term of this patent shall not extend beyond the expiration date of Pat. No. 5,659,217.

[21] Appl. No.: 878,042

[22] Filed: Jun. 18, 1997

Related U.S. Application Data

[63] Continuation-in-part of Ser. No. 384,061, Feb. 10, 1995, Pat. No. 5,659,217.
[51] Int. Cl.$^6$ ................................................. H02K 21/24
[52] U.S. Cl. ........................................ 310/156; 310/154
[58] Field of Search ...................................... 310/156, 154

[56] References Cited

U.S. PATENT DOCUMENTS 5,659,217  8/1997  Petersen ................................. 310/156

*Primary Examiner*—Nestor Ramirez
*Assistant Examiner*—Thanh Lam
*Attorney, Agent, or Firm*—Mueller and Smith, L.P.A.

[57] ABSTRACT

A P.M. d.c. motor which may utilize "brushless" commutation. The motor includes a stator assembly with a plurality of upstanding discrete spaced-apart core components formed in a circular locus generally parallel with the motor axis. Each core component includes a relatively lengthy winding association region and extending therefrom a pole piece region providing a flux interaction surface. A field winding mounted upon a bobbin is positioned over the core component at the winding association region and when excited, generates electromagnetic flux at the flux interaction surface. A permanent magnet component is carried by a rotor such that its interaction surface is adjacent to that at the pole piece region, and is spaced therefrom to define a flux working gap at a desirably lengthy working gap radius from the motor axis.

20 Claims, 11 Drawing Sheets

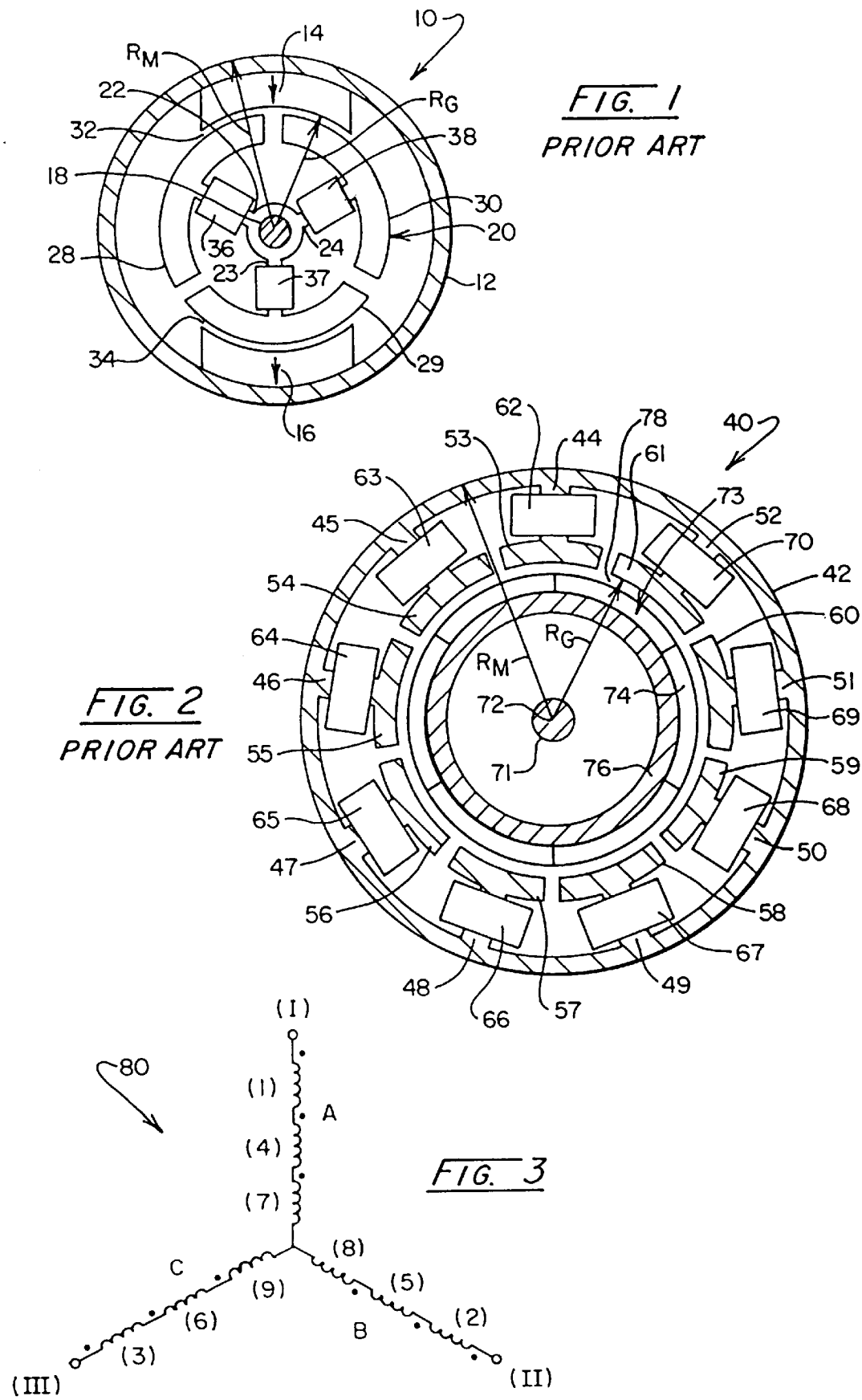

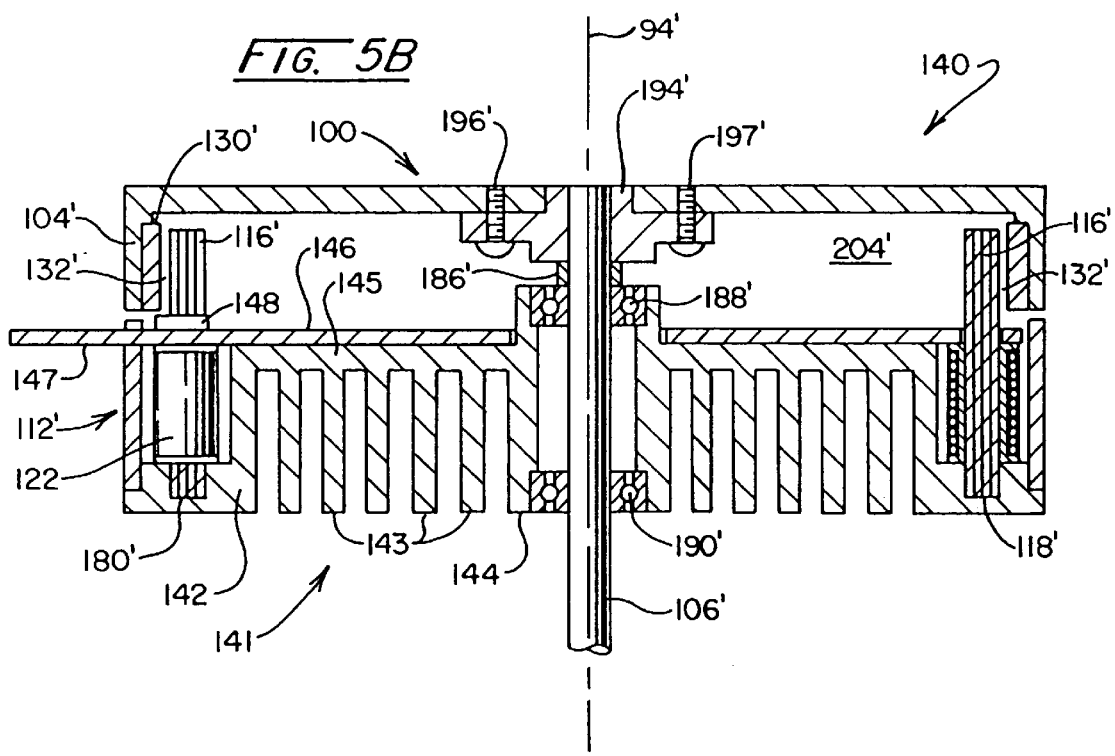
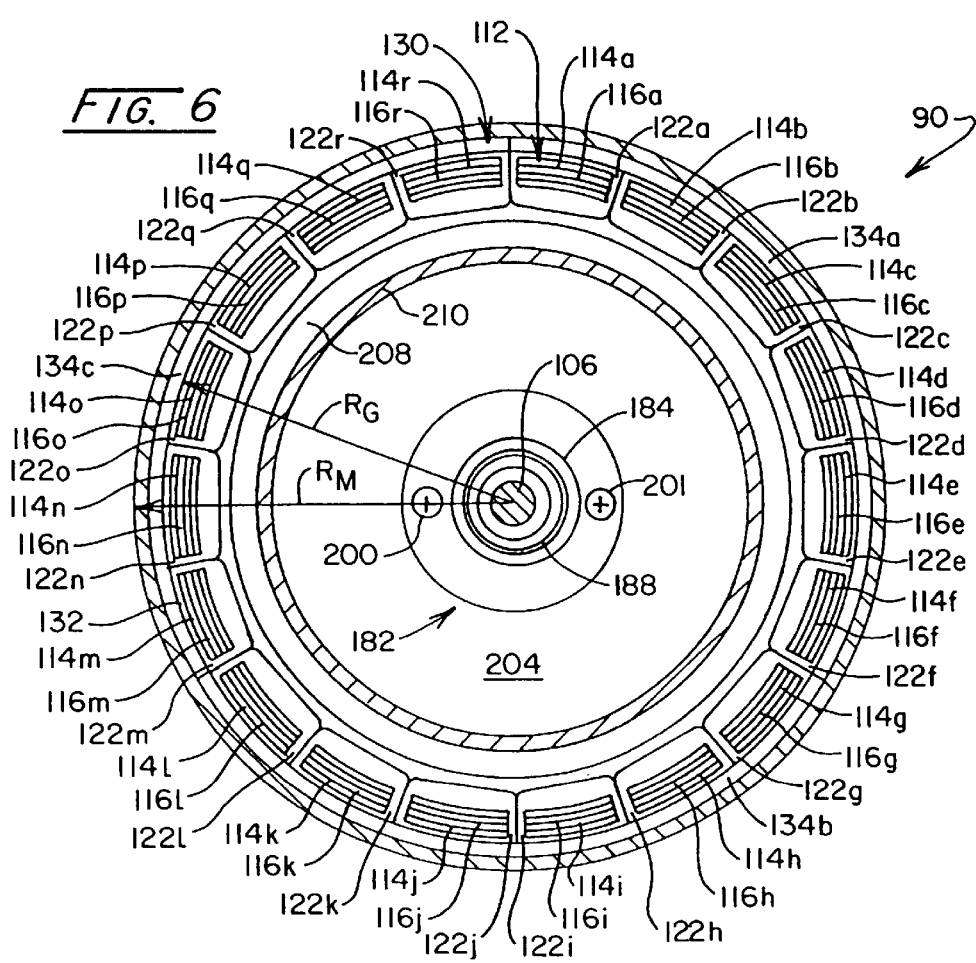

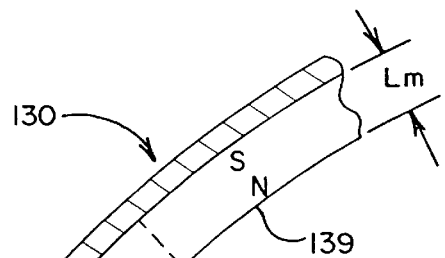
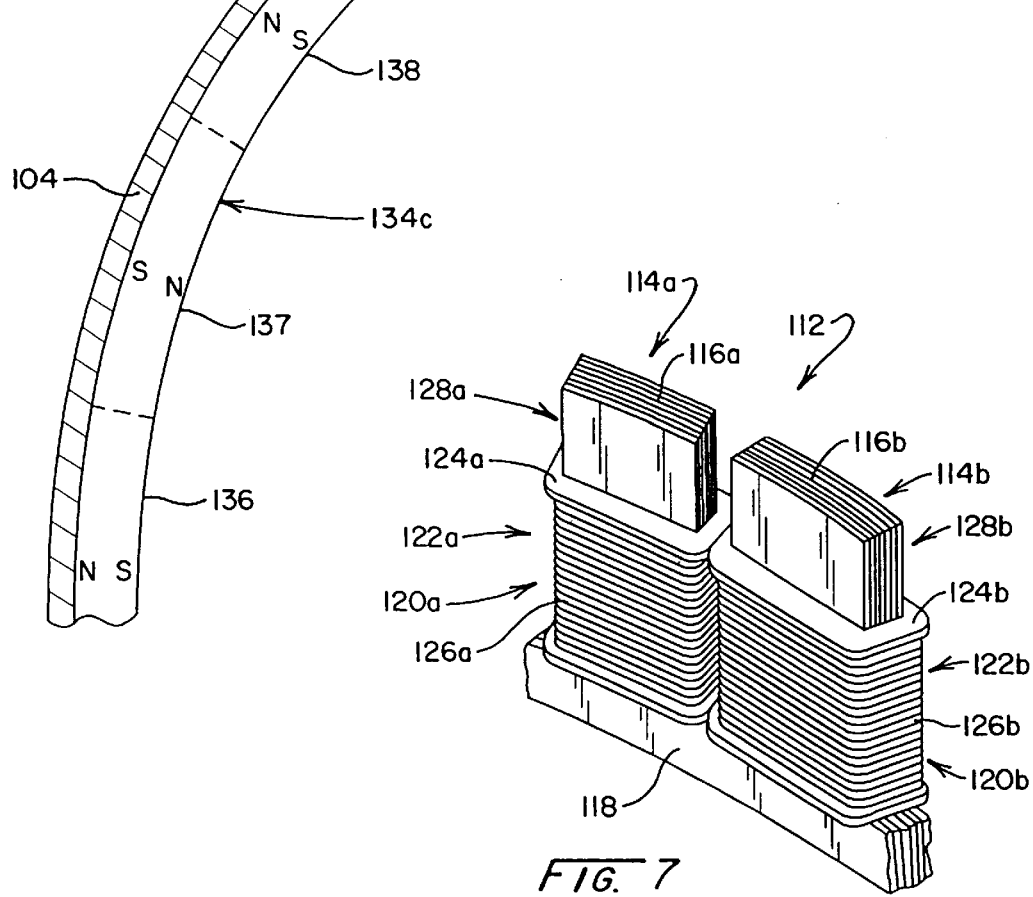
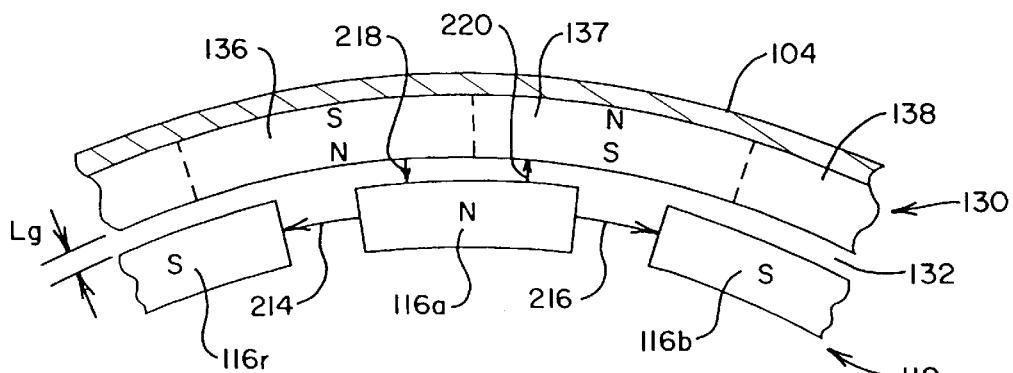

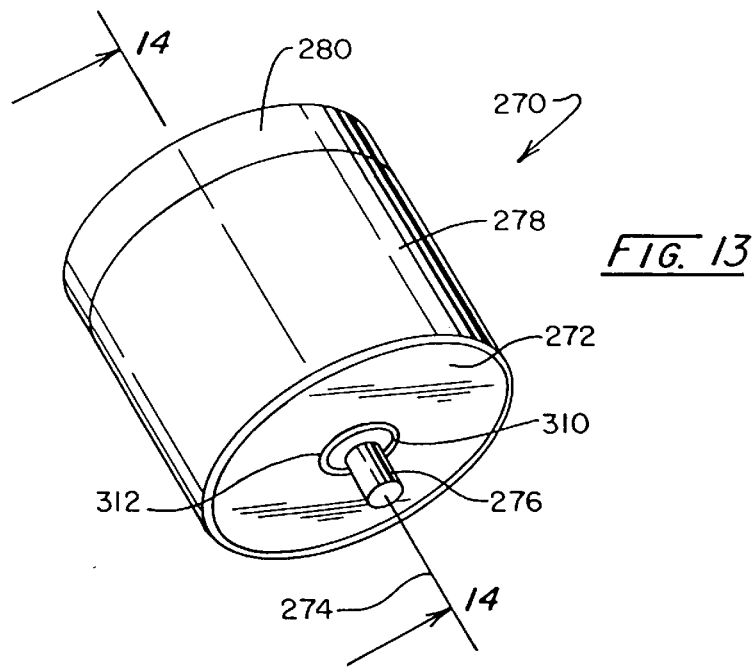
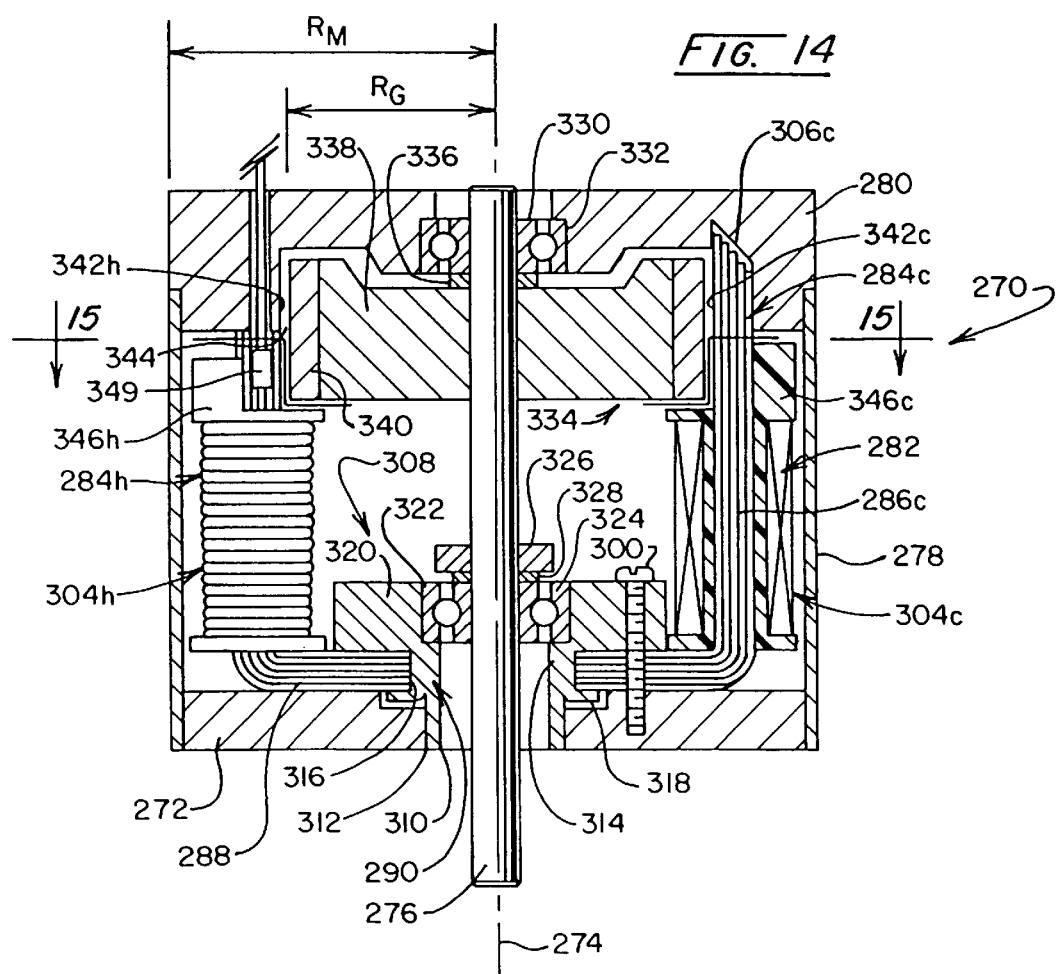

PERMANENT MAGNET D.C. MOTOR HAVING A RADIALLY-DISPOSED WORKING FLUX GAP

CROSS-REFERENCE TO RELATED APPLICATIONS

This application is a continuation-in-part of U.S. application Ser. No. 08/384,061, filed Feb. 10, 1995, entitled "Permanent Magnet D.C. Motor having a Radially-Disposed Working Flux Gap" now U.S. Pat. No. 5,659,217.

STATEMENT REGARDING FEDERALLY SPONSORED RESEARCH

Not applicable

BACKGROUND OF THE INVENTION

Substantially all smaller, fractional horsepower electric motors intended for application in the relatively low cost, high volume consumer marketplace have retained classic design features, essentially from their inception decades ago. Most d.c. forms of such motors which are produced at lower cost are of a PM (permanent magnet) variety and are commutated by brushes. In a wide variety of applications, they are powered by batteries. The performance exhibited by these low cost motors leaves much to be desired. Their design results in an inherently poor heat dissipation which, in turn, causes their performance in battery powered consumer devices such as hand tools to be marginal. As more heat is generated due to increased load and current demand, the attendant temperature rise increases the impedance of the motor windings which, in turn, diminishes speed generating capability of the motor. Thus, such motive devices are unable to deliver a continuous high output power performance.

Moreover, brush commutation systems are electrically noisy, precluding their use in conjunction with modern electronic equipment such as computers, and further precluding their use for spark free applications as in the marine field. The classic design for brush commutated PM motors does exhibit, however, the salient aspect of providing a relatively high ratio of the radius from their shaft axis with respect to their working gap to their outer radius. That ratio, typically, is about 0.7 or higher.

The higher ratio is achieved because of a design wherein the laminar pole components about which windings are provided are mounted upon the rotating shaft of the motor. These rotating pole pieces, then extend radially outwardly to the flux working gap in adjacency with outwardly disposed permanent magnets which are mounted adjacent to the outer housing of the motor. The result is an extended radius to the working gap but with the disadvantage of a substantial inability to transfer heat from heat generating coil components on a practical basis through the shaft and bearings to the outside. Fan components have been attached to the shafts but with no practical improvement in motor performance. Of course, the spinning rotor winding requires balancing as part of production. Such typical winding based rotors are characterized by a long average winding turn length that is at least twice as long as the length of the rotor lamination stack. To increase the power of these motors, stack length typically is increased rather than diameter. Thus, the average turn length increases as the length of the rotor stack is increased to increase motor output power resulting in the requirement to increase the diameter of the wire to maintain the motor impedance. The larger diameter wire often results in less turns per pole which, in turn, works against the desired power improvement which was the reason why the stack length was originally increased. This assembly is seen to occur in the conventional designs of both brush commutated and brushless radial gap motors. Notwithstanding their drawbacks, these brush commutated motors prevail in modern consumer products such as hand tools simply because of lower cost.

Over the past, demands did arise for permanent magnet motors commutated by techniques other than the use of brushes. Solid-state electronically commutated or "brushless" small permanent magnet motors entered the market by necessity. For example, brush commutation motors with attendant electrical noise and shorter service life are totally unacceptable as the hard disk drive spindle motor component of a computer. These brushless motors along with the required electronic commutating circuit are expensive to an extent heretofore precluding their use in conventional products intended for consumer markets. However, for applications, such as the computer field, the higher costs are accommodated for out of necessity. In a more conventional design of brushless PM D.C. motors, field windings are positioned about stationary, laminar stator poles which extend inwardly from the outer cover of the motor. The permanent magnet assemblage for the motor is mounted on and rotates with the shaft. An immediate advantage of this arrangement resides in good heat dissipation, providing for stable operation over a wide power range. Additionally, a spinning rotor magnet generally does not require balancing. An immediate disadvantage of the motor resides in its poor power production per unit diameter, i.e., the motor exhibits a relatively low ratio of radius to the working gap from the shaft axis with respect to the radius from the shaft axis to the outer surface of the motor. For motors under 3 inches in diameter, that ratio typically will be about 0.5. This means that the motors inherently exhibit lower power production for their weight and bulk. Further, the conventional designs require longer lamination stacks coincident with longer field winding path lengths which results in heavier weight and an elevated cost for the development of equivalent power.

In response to the highly exacting demands of the computer industry, brushless PM motors have undergone certain levels of refinement. However, such refinements have not mitigated the high costs of the motors, rendering them unacceptable for consumer applications. Typical of such refinements, the subject of detent torque has been addressed in the design of such motors for computers. Inasmuch as the motors are configured having steel core stator poles and associated field windings performing in conjunction with permanent magnets, there occurs a somewhat inherent development of detent torque. Without correction, during an excitation state of the motor windings creating rotational drive, this detent torque will be additively and subtractively superimposed upon the operational characteristics of the motor output to distort the energized torque curve, increase ripple torque, reduce the minimum torque available for starting and, possibly develop instantaneous speed variations. Such instantaneous speed variations generally are uncorrectable by electronics or the like. Another aspect associated with the demands of the computer industry resides in the ever increasing smallness of disk drives attendant with increases in bit densities. PM brushless d.c. motors have been called upon to be fabricated having unusually small outer diameters such that, for example, they may fit within the hub of a computer disk. These motors usually spin the outer surface of the motor diameter upon which the disk drive storage disks are mounted. In this fabrication technique, the motor is constructed similar to conventional PM D.C. brush type motors with the windings on the inside. They also exhibit similar poor heat dissipation characteristics as PM D.C. brush type motors.

Petersen, in U.S. Pat. No. 4,745,345, entitled "D.C. Motor with Axially Disposed Working Flux Gap", issued May 17, 1988, describes a PM D.C. motor of a brushless variety employing a rotor-stator pole architecture wherein the working flux gap is disposed "axially" (parallel with the motor axis) and wherein the transfer of flux is parallel with the axis of rotation of the motor. This "axial" architecture further employs the use of field windings which are simply structured being supported from stator pole core members which, in turn, are mounted upon a magnetically permeable base. The windings positioned over the stator pole core members advantageously may be developed upon simple bobbins insertable over the upstanding pole core members. Such axial type motors have exhibited excellent dynamic performance and efficiency and, ideally, may be designed to assume very small and desirably variable configurations. However the motors are relatively expensive, requiring costly sintered rare earth magnets and the like which, in turn, exhibit a high axial attractive force between the rotor and the stator which is modulated upon the excitation of the field windings creating an undesirable noise level for certain applications such as disk drives.

Petersen, in U.S. Pat. No. 4,949,000, entitled "D.C. Motor", issued Aug. 14, 1990, describes a d.c. motor for computer applications with an axial magnetic architecture wherein the axial forces which are induced by the permanent magnet based rotor are substantially eliminated through the employment of axially polarized rotor magnets in a shear form of flux transfer relationship with the steel core components of stator poles. The dynamic tangentially directed vector force output (torque) of the resultant motor is highly regular or smooth lending such motor designs to numerous high level technological applications (computer disk drives) requiring both design flexibility, volumetric efficiency, low audible noise, and a very smooth torque output. That form of motor also requires the noted sintered permanent magnet structures and other costly materials which preclude the application of the motors to consumer products.

Petersen, et al., in U.S. Pat. No. 4,837,474, entitled "D.C. Motor", issued Jun. 6, 1989, describes a brushless PM d.c. motor in which the permanent magnets thereof are provided as arcuate segments which rotate about a circular locus of core component defining pole assemblies. The paired permanent magnets are magnetized in a radial polar sense and interact without back iron in radial fashion with three core components of each pole assembly which include a centrally disposed core component extending within a channel between the magnet pairs and to adjacently inwardly and outwardly disposed core component also interacting with the permanent magnet radially disposed surface. With the arrangement, localized rotor balancing is achieved and, additionally, discrete or localized magnetic circuits are developed with respect to the association of each permanent magnet pair with a pole assembly. As before, the motor is a specialized device of relatively high cost and intended for the computer industry.

To the present time, there has been no essential breakthrough in the development of brushless PM motors which can contribute their substantial advantage of heat dissipation and electrically quiet control to use with inexpensive consumer products such as hand tools, kitchen implements, and the like.

BRIEF SUMMARY OF THE INVENTION

The present invention is addressed to d.c. motors which may be controlled in a "brushless" manner, and produced at practical cost levels commensurate with their incorporation into products intended for the consumer marketplace. In addition to their practical cost, the motors not only exhibit the desirable heat dissipation advantages of conventional brushless designs, but also provide improved torque output characteristics. One factor contributing to this improved torque performance resides in a relatively high ratio of the radius from the motor axis to its working gap with respect to the corresponding radius to its outer periphery. For example, that ratio typically is above about 0.7 for motors between about 1 and 3 inches in diameter Excellent torque output performance is achieved even though lower cost, lower energy product permanent magnets may be employed with the motors. Through the use of permanent magnet components having a ring configuration and a north-to-south pole magnetization oriented radially with respect to the motor axis, narrow flux working gaps become available. These shorter gaps, when employed with the ring-shaped, radially-magnetized permanent magnet component, serve to achieve ratios of magnet thickness to radial gap length of values greater than about 3. For motor architectures according to the invention having outside diameters of greater than about 2 inches, for example, a material savings is achieved with a stator assembly incorporating a core structure formed of multiple laminations of magnetically permeable material configured in a ring formation.

Other objects of the invention will, in part, be obvious and will, in part, appear hereinafter.

The invention, accordingly, comprises the apparatus possessing the construction, combination of elements, and arrangement of parts which are exemplified in the following detailed description. Reference to that description and to the accompanying drawings should be had for a fuller understanding and appreciation of the nature and objects of the invention, although other objects may be obvious to those skilled in the art.

BRIEF DESCRIPTION OF THE DRAWINGS

For a fuller understanding of the nature and objects of the invention, reference should be had to the following detailed description taken in connection with the accompanying drawings wherein:

FIG. 1 is a sectional schematic representation of a conventional d.c. motor having three rotor poles and two stator poles as conventionally commutated utilizing brushes;

FIG. 2 is a sectional schematic representation of a conventional brushless d.c. motor, FIG. 3 is an electrical schematic diagram of a Y-type excitation winding interconnection;

FIG. 5B is similar to FIG. 5A but shows an alternate architecture for heat dissipation;

FIG. 6 is a sectional view taken through the plane 6—6 shown in FIG. 5A;

FIG. 7 is a partial perspective view showing a core component and associated field winding assembly employed with the motor of FIG. 4;

FIG. 8 is a perspective view of a section of a plastic bonded ring type magnet employed with the motor of FIG. 4;

FIG. 10 is a schematic top view of permanent magnet sectors and pole components of the motor of FIG. 4 showing electromagnetic and permanent magnet flux paths;

FIG. 13 is a pictorial view of another motor structured in accordance with the invention;

FIG. 14 is a sectional view taken through the plane 14—14 in FIG. 13;

Figure 4:
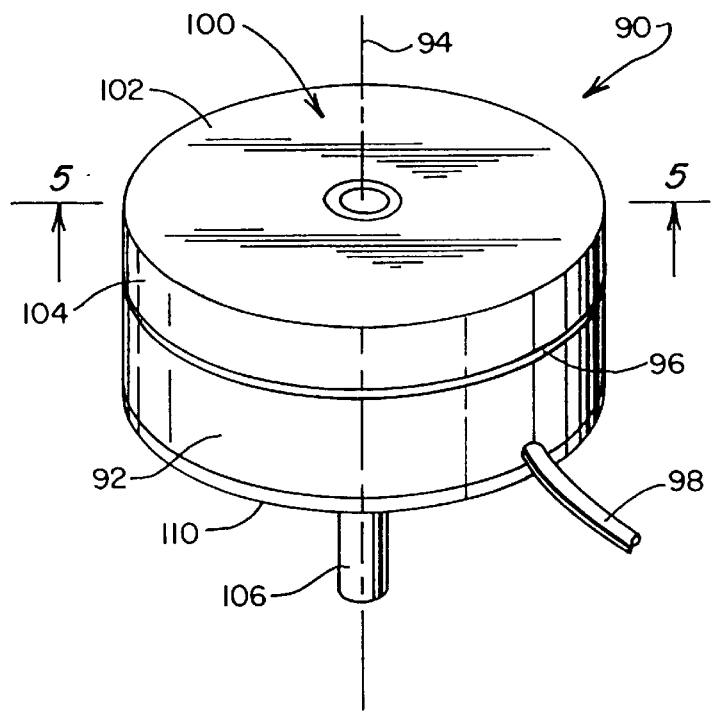
FIG. 4 is a perspective view of one motor embodiment according to the invention.

The drawings will be described further in connection with the following Detailed Description of the Invention.

DETAILED DESCRIPTION OF THE INVENTION

Brushless D.C. PM motors as now presented, in consequence of their architecture, represent a motor entity which is commercially viable in the consumer products industry. These motors utilize magnets bonded with a plastic or other polymeric material and having an energy product value lower than sintered rare earth magnets, but in a manner which optimizes their capability for magnetic flux generation within a flux working gap. Equivalent or better performance in terms of torque output is achieved through enhanced radial distance from the motor axis to the working gap, particularly as that radius is compared to the overall radius of the motor itself. For motors of what may be considered a larger variety having, for example, diameters of about 4 inches or larger, substantial savings in otherwise expensive magnetically permeable materials employed for stator pole core definition are achieved. In effect, the motors exhibit the motor axis to working gap radial distances made available through conventional brush commutated, PM D.C. motors but with a brushless operation, while enjoying the heat dissipation advantages of conventional brushless motors.

To gain a better insight into the above comparison, reference is made to FIG. 1 wherein a stylized sectional view of a conventional PM D.C. motor, for example commutated with a brush structuring, is revealed generally at 10. Motor 10 is shown having an outer metal shell 12 which supports and serves as the back iron or magnetically permeable back component for permanent magnets, two of which are shown at 14 and 16. Generally, such magnets are of a ferrite-type which, compared to rare earth sintered magnets and the like, are relatively inexpensive, thus promoting motors as at 10 to applications in consumer markets. Rotationally mounted upon the motor shaft 18 is a rotor 20, the rotor poles of which at 22–24 are mounted for rotation about the central or motor axis 26. The poles 22–24 generally are formed as a lamination of steel sheets, which structuring facilitates magnetic flux transfer and current flow in consequence of their multiple surfaces. Each of the poles 22–24 is formed having an arcuate or flared outer tip as represented, respectively, at 28–30. Tips 28–30 are structured such that their outward ends are closely proximate each other to permit flux transfer thereacross. As represented at 32 and 34, each rotor pole rotates in proximity with the inwardly-disposed surfaces of permanent magnets 14 and 16 to define a working air gap which may be referred to as "radial" inasmuch as the polarization of magnets 14 and 16 is along the radius from the motor axis 26. Finally, field windings 36–38 are wound about the respective poles 22–24 internally of their outer tip portions 28–30. By selectively exciting these field windings, for example, through a rotating commutator (not shown) mounted on shaft 18 with fixed brushes performing in conjunction with the rotating commutator, a field is caused to move about tips 28–30 as the rotor rotates. That field interacts with the magnetic field of permanent magnets 14 and 16 to develop motion. With the geometry shown, it may be observed that the outermost or maximum outer motor radius, $R_M$, is not of substantially greater length than the corresponding radius, $R_G$, to the center of the working air gaps as at 32 and 34. This is an advantage of such general structuring, inasmuch as the amount of torque for a given motor size is quite dependent upon the radius to the working air gap, $R_G$. This quality of torque generating capability may be expressed by the ratio $R_G/R_M$. The typically encountered value for the conventional brush PM motor is 0.7 or greater. Because of their lower cost, such motors essentially predominate in the application of motor technology to consumer products. The disadvantages associated with motors as at 10 reside in their poor heat dissipation characteristic. As power is increased, this poor heat dissipation limits the ability to deliver continuous high output power. In this regard, it may be noted that the heat generating components of the motor 10 are the windings 36–38 which are mounted upon shaft 18. Thus, for practical purposes, the route for conductive heat transfer out of motor 10 is through the shaft and the bearings, a highly inefficient arrangement. As another disadvantage of motors such as at 10, the presence of windings 36–38 essentially upon the shaft 18 require that the rotor be balanced for most applications. Also, to improve power output capabilities, the rotor stack length may be increased which, in turn, increases the average turn length of the rotor windings. Such increase in the average turn length, however, increases the resistance of the windings and thereby ultimately decreases the power out. Although the wire diameter may be increased such that the resistance of the motor is maintained, there often is insufficient winding area to support the increased wire diameter.

In the discourse to follow, it will become apparent that the time requirement for machine winding the rotors of motors 10 will be higher and the procedures less flexible than in the case for the bobbin based winding used with the present invention.

Referring to FIG. 2, a conventional brushless motor is represented in schematic fashion at 40. Motor 40 is formed having an outer shell or stator 42 made up of laminations from which inwardly-depending stator pole pieces 44–52 depend, and terminate in flared tips shown, respectively, at 53–61. Field windings 62–70 are positioned about the respective pole pieces 44–52. A shaft 71, rotating about a motor axis 72 supports a rotor shown generally at 73 which, in turn, supports a sequence of permanent magnets having six magnetic poles thereof which may be alternately polarized in the earlier-noted radial sense, and are represented at 74. A magnetically permeable back component or back iron is shown at 76. Not shown in FIG. 2 is a control pick-off assembly, for example, magnetically responsive devices located in adjacency with rotor 73 which serve to instantaneously locate the rotational orientation of rotor 73 relative to stator 42. This motor architecture provides for good heat dissipation with stable operation over a wide power range. In this regard, note that the heat generating components such as windings 62–70 are coupled in thermal transfer with the outer shell 42. Note, however, that the radius from the motor axis 73 to the working air gap 78 again identified as $R_G$, is much smaller than the radius to the outer boundary of the motor $R_M$. Typically, the ratio $R_G/R_M$ will be about 0.5 to 0.7. This means that the motor 40 exhibits poorer power production per unit motor diameter. However, another advantage resides in a spinning rotor 73 which generally does not require balancing. But, an additional disadvantage resides in the presence of a requirement for a longer lamination stack, in part making up for the small working gap radius, $R_G$. This increases motor weight and, in turn, requires a longer winding average turn length with the overall increased wire length resulting in more copper and increased material costs for an equivalent power production. Additionally, the internal winding configuration of the stator of motor 40 necessitates even longer winding time requirements as compared to the motor 10.

By contrast, the brushless motor now presented essentially minimizes the amount of lamination or stack material required, particularly for larger motor sizes in the range of 4 inches diameter or more. This lowered material requirement reduces motor cost. The now presented motor uniquely employs an architecture permitting the use of less volume of permanent magnet material to again reduce materials cost while exhibiting good power production per unit diameter, i.e. the ratio $R_G/R_M$ is at least about 0.7. Further controlling costs, the rotor of the motor generally does not require balancing and additionally exhibits a short field winding average turn length which is easier to wind and which greatly reduces the costs attending the winding of the motor. Also, the shorter average turn length of each stator turn generally means a smaller required diameter wire and, accordingly, less total copper, again reducing costs. Of particular importance, the radius of the motor from its motor axis to its working air gap, $R_G$, is substantially expanded to permit the achievement of high torque outputs from small light motors.

While the winding excitation approaches for operating brushless motors such as those according to the invention vary somewhat, the windings typically are interconnected in either a "Y" or a "Δ" configuration for three phase operation. Looking to FIG. 3, a typical "Y" circuit topology is revealed for nine field windings which may perform, for example, in conjunction with a rotor structure incorporating six polar magnet regions. Each leg of the Y circuit 80 represents a given phase, i.e. phase A, phase B, and phase C. The field winding or coil designations are represented as being numbered 1 through 9 in parenthesis in the drawing, and it may be observed that in phase A, windings 1, 4, and 7 are energized, while in phase B, windings 2, 5, and 8 are energized, and in phase C, windings 3, 6, and 9 are energized. For the instant example, depending upon electrical convention, a "bipolar" form of excitation is employed. For this form of excitation, positive electrical coupling may be made to one outer terminal of the Y circuit 80, while a negative circuit connection is made to one other terminal. In the sequence of energization, any one given phase is energized in a two-step sequence. Thus, the phase combination, AC may be energized by applying a positive source to terminal I, while the corresponding negative connection is applied to terminal III. Depending upon any desired direction for rotation of the rotor of the motor, an energizing sequence may be developed which is repeated in the course of normal motor operation with the objective of creating sequential torque vectors presented as tangent forces to the circular locus of the working air gap driving the rotor structure.

In the derivation of brushless PM motors with designs which are cost effective for practical application in the consumer product market, design architecture may vary depending upon the diametric size of the motor. In this regard, motors, for example, having outside diameters of about two inches are considered "small" in terms of the present design, while motors of larger diametric extent, for example 4 inches or greater, are considered "larger" to the extent, for example, that cost considerations look more pointedly to the amount of magnetically permeable lamination material which is employed. For all designs, however, the highly desirable ratio of the radius to the working gap, $R_G$, to the maximum outer motor radius, $R_M$, remains greater than about 0.7.

Referring to FIG. 4, a perspective representation of a larger motor, having a outer motor diameter of about 4 inches is represented generally at 90. Motor 90 will be seen to have an architecture referred to as "outside radial gap" which maximizes the length of the radius to the working gap, $R_G$. Motor 90 is configured having a cylindrically shaped housing 92. This housing 92 incorporates portions of the stator assembly and extends upwardly in parallel with the motor axis 94 to an annular edge 96. Controlled d.c. input to the motor 90 is through, for example, a cable 98 extending from the side of housing 92. Above the housing 92 and its edge 96 is a rotor 100 having a top surface 102 which extends to a circumferentially disposed magnet and back iron or back component supporting flange 104. Rotor 100 is driven in rotation about the motor axis 94 and functions to drive a motor shaft as at 106 coaxially disposed with axis 94 and supported at a bearing structure mounted within the housing 92.

Figure 5A:
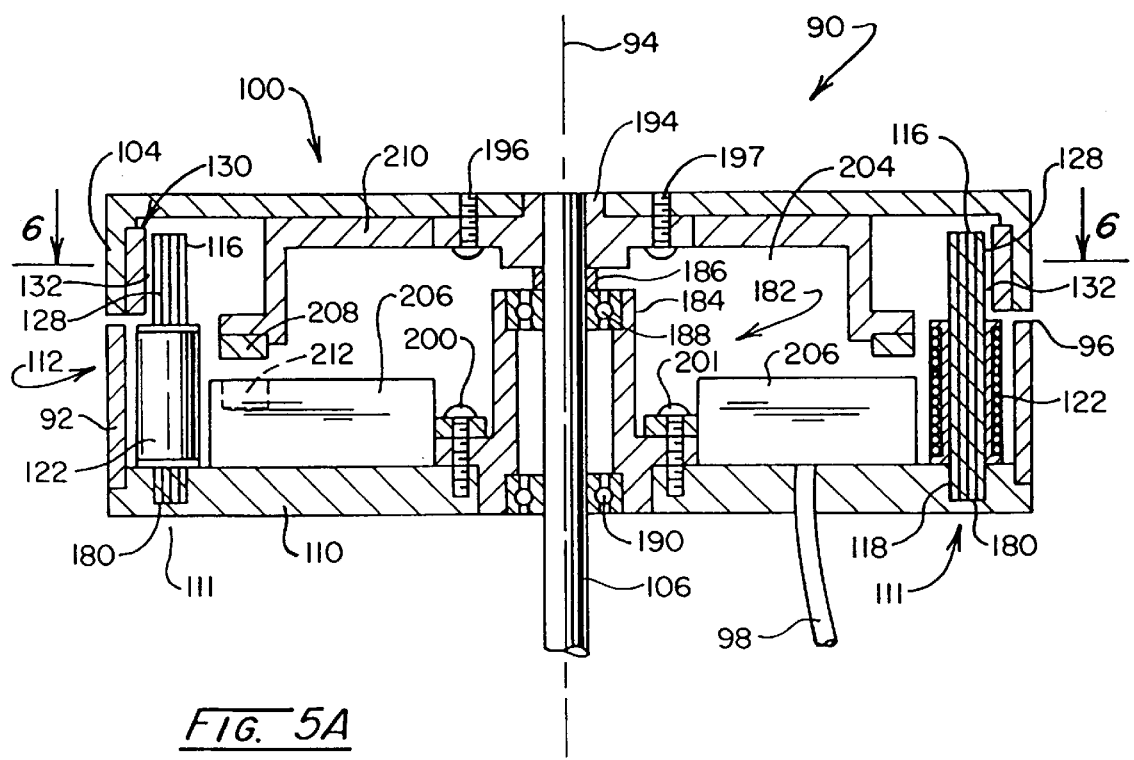
FIG. 5A is a sectional view taken through the plane 5—5 shown in FIG. 4.

Looking to Figs. 5A and 6, the internal structure of motor 90 is revealed. In general, motor 90 employs a support structure which includes a base 110. Base 110 is circular and formed, for example, of aluminum. Supported from this base 110 at a stator pole assembly mounting portion 111 disposed along the outer periphery are a plurality of stator assemblies represented generally at 112 which are arranged in a circular locus. FIG. 6 reveals the presence of 18 such stator pole assemblies which are identified at 114a–114r. Looking additionally to FIG. 7, it may be observed that each of the stator poles 114a–114r has a laminar core component 116a–116r which is formed integrally with and extends above a core interconnecting base support portion 118. Core components 116a–116r are relatively lengthy and arranged generally parallel with motor axis 94. Each may be considered to have two portions, one a winding association region as seen at 120a and 120b in FIG. 7, over which is positioned a stator winding assembly 122a–122r, bobbins 124a and 124b being shown in detail in FIG. 7, assemblies 122a and 122b being shown in detail in FIG. 7. Each of the assemblies 122a–122r is formed of a plastic, non-conducting bobbin 124a–124r, about which are provided field windings 126a–126r, windings 126a and 126b of which are revealed in detail in FIG. 7. The field windings 126a–126r, when excited, interact to generate electromagnetic flux (an energized field) within the laminar core components 116a–116r and base structure 118. For the instant embodiment, there are eight such laminations, each having a sheet thickness of about 0.014 inch. Thus, the total radial thickness of the cores is about 0.112 inch. Above the winding association region as seen in FIG. 7 at 120a and 120b, each of the core components 116a–116r continues integrally to establish a pole piece region as seen in FIG. 7 at 128a and 128b. This pole piece region which is referred to generally at 128, typically extends above the windings 126a–126r an amount representing about one-half or less of the height of the windings or their associated winding association region 120. In general, the pole piece region height is not made higher than the height of the windings. It is the flux interaction surface of this pole piece region 128 of relatively large dimension which is employed to confront a relatively thin but axially lengthy magnet across a relatively short working gap. The distance between the pole piece regions 128 is selected such that the electromagnetic flux path is between adjacent stator poles. This is achieved by making that distance a value representing a least impedance to the flow of electromagnetic flux with respect to other paths which might be available. It may be observed that the inwardly disposed flux interaction surface of each pole piece is curved or "radiused" as is the outwardly disposed surface of each pole piece. An alternative core structure formed of processed ferromagnetic particles may be employed with the instant motors. Ideally, these powder-based cores should be fashioned such that each particle of ferromagnetic material is electrically insulated from adjacent particles to avoid eddy current circulation. The core structures are formed by powder pressing with a binder and a subsequent heating step or sintering. Alternately, the powdered metal is combined with an adhesive and molded without heating. Core production is both simplified and accelerated with this approach. Such powder-based materials are available, for example, from TDK Corporation of Tokyo, Japan, or Keystone Powdered Metal Co., of St. Marys, Pa.

The windings, for example as shown at 126a and 126b will exhibit a given average turn length about the winding association regions of the core structures. It is interesting to observe that this average turn length remains constant notwithstanding the height selected by the designer for the winding association region or the pole piece region. In all other conventional radial motor structures, average turn length will increase as the height the stator or lamination structure increases.

Figure 19:
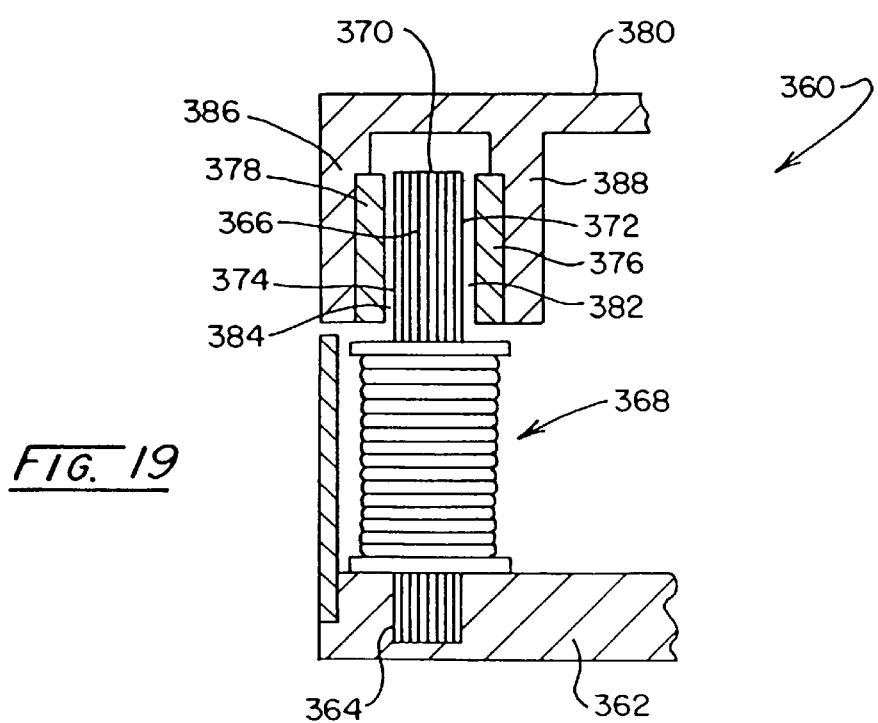
FIG. 19 is a partial sectional view of a variation of the architecture of the motor of FIG. 4.

An embodiment of the instant invention provides that the stator pole piece area has two flux interaction surfaces, one facing radially inward and the other facing radially outward. Depending on the application, the designer can choose the most advantageous location for the permanent magnet assembly magnet component, utilizing either the inward facing or outward facing surface or in applications requiring maximum power output in a minimum motor envelope two magnet components can be used as shown in FIG. 19.

Returning to FIG. 5A, rotor 100 is seen to have the general shape of an inverted cup. For the present embodiment, it is fashioned of steel, inasmuch as it also serves as back iron to the permanent magnet material which it carries. In this regard, the permanent magnet assembly shown generally at 130 includes a magnet component containing a sequence of alternating magnetic poles which is generally shaped as a ring. Assembly 130 is fixed to the inward surface of supporting flange 104 of rotor 100. The assembly is seen to have a height in the direction of axis 94 corresponding with the height of pole piece region 128. Thus operationally paired, the flux interaction surface of pole piece region 128 and the corresponding confronting flux interaction surface of permanent magnet assembly 130 define a relatively large area working gap 132 which also is of short radial length, $L_g$, i.e., the interacting surfaces are close together. Note additionally, in FIG. 6, that the radius to the gap, $R_G$, is quite lengthy for the size motor involved and that the corresponding ratio $R_G/R_M$ is high. This achieves a highly advantageous torque generation characteristic for the motor 90.

Permanent magnet assembly 130 preferably is formed of a thin magnet material, such as neodymium iron boron bonded in a plastic or polymeric binder. For convenience, the ring-shaped assembly 130 is formed, for example, in 120° sector components seen in FIG. 6 at 134a–134c. Component 134c is seen in FIG. 8 to be magnetized with successive opposite polarities in four adjacent magnetic pole segments 136–139. Magnetization is carried out radially with respect to motor axis 94 to provide alternating north and south pole components. The thin radial dimensioning of magnet assembly 130 provides a north to south pole component thickness or length, $L_m$, of relatively small value while the narrow working air gap, Lg, of significantly smaller value promotes highly desirable "load line" values. As a consequence, this favorable $L_m/L_g$, ratio (load line) makes possible the use of lower energy product magnet materials to achieve equivalent air gap flux values as those present in the axially magnetized motors represented in U.S. Pat. No. 4,949,000. In the latter patent, the required magnet material is of a sintered rare earth type with typical energy products of 27 MGO to 37 MGO In contrast, with the configurations presented herein, energy product values of approximately 10 mgo will produce an equivalent air gap flux density.

Figure 9:
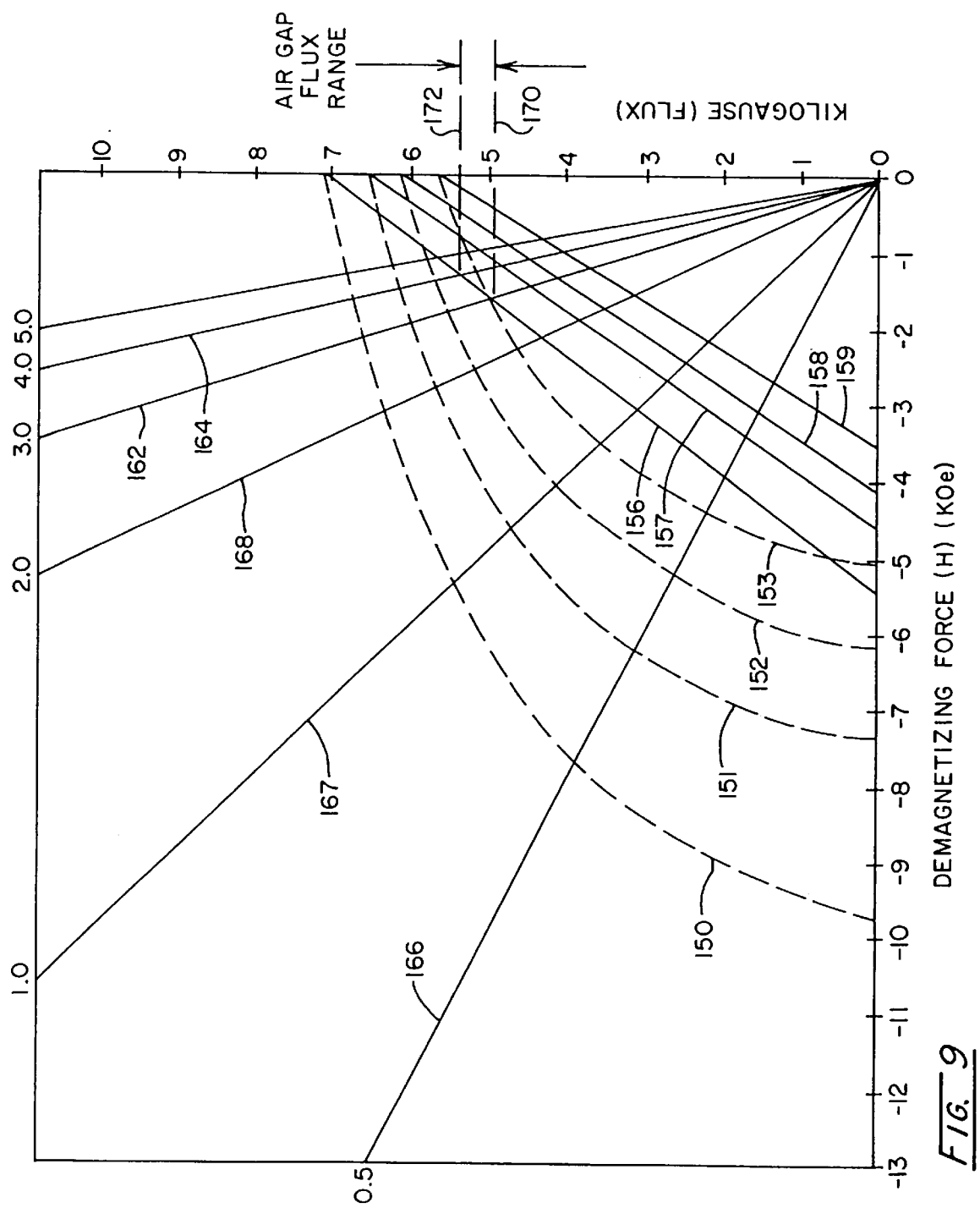
FIG. 9 is a B–H family of curves showing load lines thereon.

Referring to FIG. 9, the second quadrant of a conventional B–H curve is revealed for a 10 MGO energy product plastic bonded neodymium-iron-boron permanent magnet. In the figure, demagnetizing force is shown in progressively negative values from a 0 value, while generated kiloGauss (flux) is shown along the ordinate. Intrinsic demagnetization curves are shown at 150–153 for respective temperatures of 24° C. (room temperature), 80° C., 120° C., and 150° C. Correspondingly, normal demagnetization curves are represented at 156–159 for the corresponding same sequence of respective temperature values. Load lines having values typical for the motors of the instant invention are represented at 162 and 164. In general, these values can be considered to represent the length of the magnet, $L_m$ divided by the radial width of magnet-to-stator gap, $L_g$. However, curves 162 and 164 are empirically adjusted for anticipated flux leakage, for example, to the extent of about 50%. As further revealed in FIG. 9, a typical load line value, for example falling between lines 162 and 164 at a value of 3.5 will produce an air gap flux density of approximately 5.2 kilogauss at room temperature. Load lines encountered with miniature high performance motors of the type represented in U.S. Pat. No. 4,949,000 (supra) would be represented in the region between load lines 166 and 167. Accordingly, to achieve an equivalent air gap flux of 5.2 kilogauss, a motor of the type presented in the noted U.S. Pat. No. 4,949,000 with a load line of, for example, 0.85 would require magnet material of approximately 30 MGO energy product. In general, 10 MGO material is of a bonded type (plastic) whereas the 30 MGO material currently is a sintered type and a significant cost differential exists between them. Of course, motors of the instant invention would benefit from the use of high energy product materials should those materials become available in cost effective form. Also, the motors of the instant invention benefit from the fact that the magnet pole area can increase significantly without changing the load line by increasing the axial length of the radial magnet coincident with an increase in the height of the pole piece region, thereby effecting a much greater total flux transfer, and therefore, higher motor power production capability.

Even though motors of the instant invention have magnet load lines typical of today's high performance radial brushless P.M. D.C. motors and use magnet materials typical for such motors there is a significant difference in how the radial pole surface of the permanent magnet rotor interfaces with the laminations of the stator pole piece regions. Whereas, conventional radial motors stack all the stator laminations axially with the edge or thickness of each lamination forming a portion of the surface of the pole piece region, therefore, exposing each lamination directly to one surface of the working gap, of radial thickness Lg, motors of the instant invention interface each lamination of the pole piece region in radially stacked series succeeding material adjacency from the working gap. This means only the first lamination of the series comprising a pole piece region forms the surface of the first flux interaction surface and, therefore, one of the radial surfaces of gap Lg, the radial pole surface of the permanent magnet, the second flux interaction surface, establishing the opposite radial surface of gap Lg.

For the ring-type permanent magnet assemblies 130 at hand, working gap lengths, $L_g$, will be in a range of about 0.012 inch to 0.016 inch. The gaps are maintained at a tolerance of ±0.002 to ±0.003 inch. In this regard, FIG. 9 reveals that for the air gap structure at hand with load line values of 3.0 and 4.0, and considering room temperature at curve 156, a flux generation range may be observed to lie between horizontal lines 170 and 172, showing a range from about 4.9 kG to about 5.4 kG. This indicates a highly efficient flux generation utilizing relatively lower energy product magnetic material and attendant lower costs. Of course, this highly desirable working gap performance is achieved at large values for the radius to the working gap, $R_G$, and a resultant substantially improved torque output for the diametric size of motor involved, as compared to conventional brushless motors with inwardly depending stator poles as exhibited in FIG. 2.

In contrast, the standard brushless motors heretofore known in the art for use in hard disk drives employ an outside magnet design with a corresponding spinning outside rotor. These motors have a relatively high $R_G/R_M$ similar to motors of the instant invention and, in typical form, utilize 10 MGO magnet materials. Such motors also use a large number of laminations relative to the motor of the present invention. Inasmuch as these laminations are disposed within the interior of the motor, relatively poor heat dissipation characteristics are exhibited with this form of brushless motor design.

Returning to FIGS. 5A and 6, the ring-shaped base support portion 118 of the stator structure 112 is seen to be supported within an annular slot 180 formed within aluminum base 110. The shaft 106 of motor 90 is seen to be aligned along axis 94 and is supported upon the base 110 by a bearing structure represented generally at 182. Structure 182 includes a cylindrically shaped bearing retainer 184, spacer 186, and spaced-apart bearings 188 and 190. Shaft 106 is coupled into and supports rotor 100 at a rotor mount 194 connected to rotor 100 with three machine screws 196–198. A similar three-screw arrangement 200–202 secures bearing retainer 184 and an associated circuit assembly 206 to the base 110.

It may be observed that with the structuring of motor 90, a substantial amount of interior space is made available as represented by the interior chamber 204 defined between base 110 and rotor 100. This chamber 204 may, conveniently, be utilized to support the control circuit assembly 206 utilized with the motor 90. Circuit 206 will require data as to the instantaneous rotational position of rotor 100. This may be supplied, for example, by the utilization of selectively magnetized inexpensive magnetic material located within a rotor position ring 208 suspended by a cup-shaped plastic support 210 fixed, in turn, to the underside of rotor 100. Ring magnet 208 is magnetized in sectors corresponding with the magnetization component of permanent magnet assembly 130. It is positioned just above one or more Hall effect devices as at 212 mounted, in turn, upon the circuit structure 206.

With the motor 90 architecture thus presented, one may observe that the sequence of operational components of it commencing with axis 94 and shaft 106 include, as a next outwardly component at the drive region, the stator pole piece 116, then next radially outwardly there occurs the working gap 132, and next outwardly from that is the permanent magnet assembly 130, whereupon, the final component is back iron 104, the outer surface of which also is the outward radial extent, $R_M$, of motor 90.

Looking momentarily to FIG. 10, the flux paths generated in connection with motors as at 90 are schematically revealed. In the figure, the numeration employed in conjunction with FIGS. 5A–5B is repeated to identify corresponding components. With the arrangement, as labeled, core component 116a of stator structure 112 is shown to be energized in a north polar sense, while adjacent stator cores 116r and 116b are energized in a south polar sense. With respect to the electromagnetic flux generated in the stator assembly, the flux path from core 116a will be, as represented at arrows 214 and 216, across the gaps between the stator structures and into the adjacent stator cores. The paths then return, for example, through base structure 118. Flux interaction of the permanent magnet sectors, as at 136–138, is, as represented by arrows 218 and 220, into the adjacent stator core as at 116a. In the representation shown, the orientation of permanent magnet and stator core is that at which a maximum torque is developed for that pole, the south permanent magnet tending to be attracted to the north stator core and the north permanent magnet flux tending to be repulsed thereby to develop a vector which is tangent to the circular locus of the permanent magnets and stator cores. By controlling the sequence of energization of the field windings 126a–126r, an optimized torque drive output may be accomplished in conventional fashion.

As noted above, a substantial amount of interior space is made available as represented by the interior chamber 204 (FIG. 5A) defined between the base 110 and rotor 100 of motor 90. Looking to FIG. 5B, another utilization of that interior space, shown at 204', is depicted. In FIG. 5B, the general motor architecture remains identical with that shown in conjunction with motor 90 of FIG. 5A. Accordingly, components of commonality between the figures are shown in primed fashion in connection with FIG. 5B. Represented generally at 140, the motor shown in FIG. 5B incorporates a base structure represented generally at 141 which is of enhanced volume by virtue of the utilization of an array of concentric cooling fins or rings, certain of which are represented at 143. The stator assembly mounting portion is reconfigured as represented at 142 to accommodate for the height of the base structure 141. Similarly, the inward bearing support is integrally formed as represented at cylindrical bearing support portion 144. Base support structure 141 thus provides a circular upper base platform 145 which may be employed to support a circuit board 146. Circuit board 146, in turn, is seen to extend at extension 147 outwardly of motor 140 so as to provide lead inputs to the circuit. Circuit board 146 additionally supports Hall effect devices, one of which is shown at 148, each fitting within a gap intermediate two stator pole pieces. Thus, the structure 210 of FIG. 5A is avoided while signal data is provided with respect to the instantaneous orientation of rotor 100' with respect to the stator core component 116'.

An interesting aspect of the embodiment of FIG. 5B resides in the advantageous assembly procedure for circuit board 146 and stator structure. With the arrangement, the laminar core components 116' are mounted within the base annular slot 180'. Circuit board 146 is configured having a locus of openings therein corresponding in position with the locations of the core components 116'. The field winding assemblies with bobbins are electrically connected by appropriate leads with the circuit located and supported by circuit board 146. Then, the circuit board assembly is positioned over the core components 116' and down essentially against the base platform 145. Close adjacency with the platform 145, however, is not required. With this arrangement, the assembly of the stator components and associated circuitry is completed. Of further note, the circuit board 146 now supports each pole piece region of the core components 116' just below the working gap 132'. This arrangement aids in overcoming the attraction between the permanent magnets of the rotor and the adjacent pole pieces. Of course, there is substantial simplification of the positioning of Hall effect sensing devices as at 148 inasmuch as they are pre-positioned on the circuit board 146.

Figure 17:
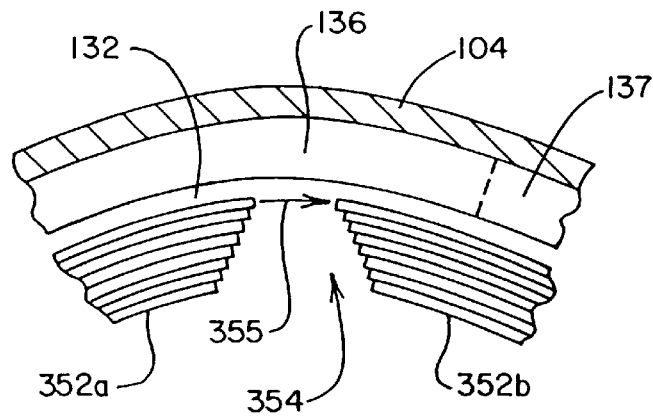
FIG. 17 is a partial top view of permanent magnet sectors and pole components for a motor according to the invention with an outwardly disposed radial gap showing a tapered stator pole gap.

Referring to FIG. 17, an alternate embodiment for the laminar pole structuring employed with motor 90 is revealed. Two laminar poles, 352a and 352b are shown in an architecture wherein the gap between the pole regions at the outermost laminations adjacent outer radial gap 132 are more closely spaced together than the inwardly disposed laminations. This then defines a tapered gap 354 which serves to concentrate the flux density in the course of transfer as represented at arrow 355 in a manner enhancing flux flow in adjacency to the gap 132 and permanent magnet segments as at 136 and 137.

Figure 18:
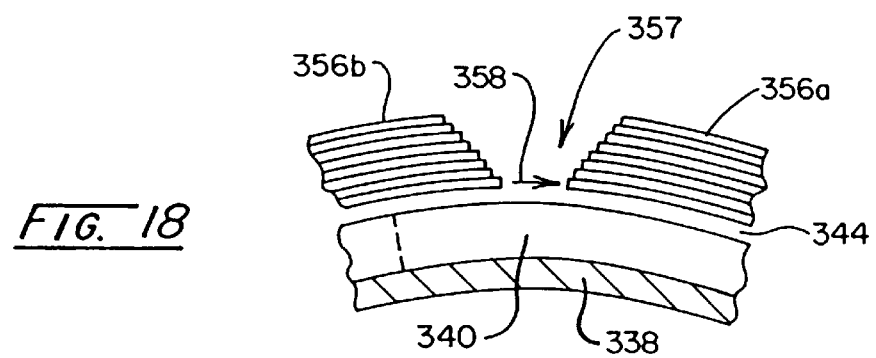
FIG. 18 is a partial schematic top view of permanent magnet sectors and pole components for an inwardly disposed radial gap motor architecture showing a tapered stator pole gap.

Referring to FIG. 18, the same arrangement is illustrated in connection with a motor as at 270 in FIG. 14 or as at 500 in FIG. 22 wherein the radial gap is inwardly disposed from the stator structure. As before, that lamination of the core structures herein shown at 356a and 356b which is closest to the permanent magnets 340 is configured having the narrowest pole-to-pole gap width. Thereafter, as the laminations are provided for radially outwardly locations, the gap between pole pieces increases to achieve the tapered configuration represented in general at 357. This serves to enhance the transfer of flux or flux flow at a location in adjacency with the gap 344 and magnets 340. This flux transfer is represented by the arrow 358.

For larger diameter motors, for example, having outer diameters of about 4 inches or more, substantial material cost savings can be realized in the formation of the stator core structure utilizing an approach taught by Petersen in U.S. Pat. No. 4,949,000 (supra). Looking to FIG. 11, the stator structure 112 for motor 90 is revealed in perspective fashion. This 18-pole or 18 core (116a–116r) stator structure 112 is formed with 8 laminations, each having a thickness of about 0.014 inch. These laminations are formed of 8 sheet members of varying dimensions selected to form the stator core structure. Utilizing the laminations as a strip metal stamping eliminates a substantial amount of the waste otherwise encountered in forming the core structure. In effect, the amount of waste developed in forming the stators of the prior art as shown, for example at stator 42 in FIG. 2, as compared with respect to the forming of the stator core utilizing the approach taught by Petersen in U.S. Pat. No. 4,949,000 (supra) shows a substantial waste reduction when one considers that both stators are formed from flat stock rolled material with a width substantially identical to the stator component. Four of the stampings are shown partially in FIGS. 12A–12D. Looking to FIG. 12A, the outermost one of the laminations is shown as a metal sheet member 230 formed as a sheet metal stamping of magnetically permeable material which is configured having 18 integrally formed upstanding core elements, certain of which are revealed from the sequence 230a–230r. These elements 230a–230r are configured having a first predetermined widthwise extent representing the widthwise extent of the core structure outer periphery. Additionally, the sheet 230 includes two upstanding half core elements 230r and 230r'. These latter elements have a widthwise extent amounting to almost half that of elements 230a–230q. Further, the elements 230a–230r are seen to be spaced apart by slots of predetermined width as represented by select components of a sequence 236a–236r. Note additionally that the member 230 is formed having a core base 238 and extends from an end 240a formed in half core component 230r to an end 240b. When these ends 240a and 240b are drawn together, an outer core ring is developed as represented and identified in FIG. 11.

Figure 11:
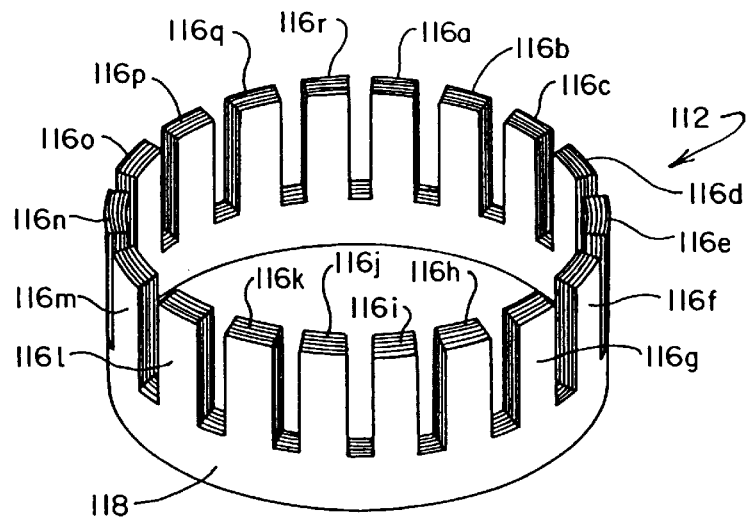
FIG. 11 is a pictorial view of the stator core assembly employed with the motor of FIG. 4.
Figure 12A:
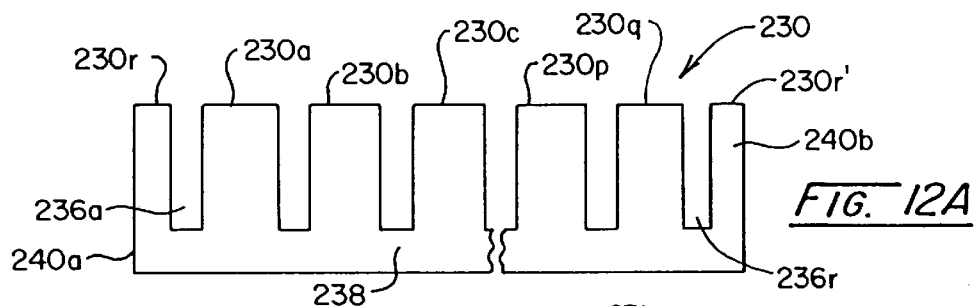
FIGS. 12A–12D are partial plan views of four sheet metal components employed in the formation of the structure of FIG. 11.
Figure 12B:
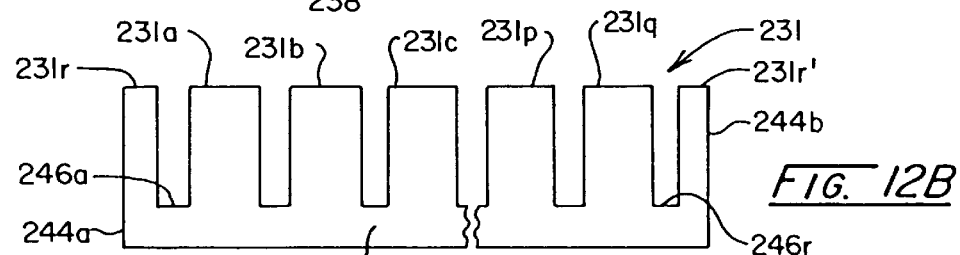

FIG. 12B reveals the pattern for a next internally disposed core ring formed of metal sheet member 231. As before, sheet member 231 includes a core base 242 and 18 upstanding core elements 231a–231r, only certain of which are revealed in view of the relatively larger number involved. The upstanding core components 231a–231r are of a next predetermined widthwise extent slightly less than the corresponding core elements 230a–230r. Similarly, two half core elements 231r and 231r' are formed in member 231 exhibiting edges 244a and 244b. The end-to-end lengthwise extent of member 231 is selected such that when the latter edges 244a, 244b are brought together to form a next interior core ring, that ring, as seen in FIG. 11 will nest within the core ring corresponding to sheet member 230. Preferably, the abutting edges 244a and 244b will be positioned away from adjacent edges 240a and 240b. The spacing between core elements 231a–231r are represented as a sequence of slots 246a–246r. These slots are configured having a widthwise extent equal to those described at 236a–236r in FIG. 12A. This achieves a desired arcuate-like segmenting of each of the resultant core components developed at 116. Generally, the slots are dimensioned equally from lamination to lamination. This provides a final gap which exhibits a constant width. By varying the slot width, a variable or tapered gap geometry can be achieved as discussed herein in connection with FIG. 17.

Figure 12C:
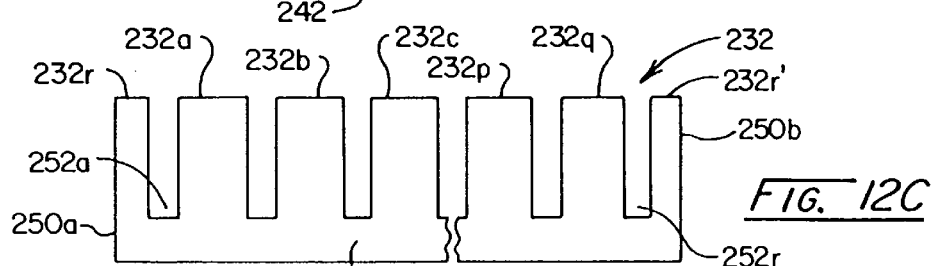

Looking to FIG. 12C, metal sheet member 232 is seen to be configured in similar fashion, having a core base 248 from which are integrally formed 18 upstanding core elements 232a–232r, only certain of which are revealed and the end elements 232r and 232r' being of half width. The latter elements define edges 250a and 250b which are drawn together to form a core ring of a third diametric extent configured to nest within the ring formed of metal sheet 231 as seen in FIG. 11. Additionally, it is preferred that edges 250a and 250b be positioned in abutment at a location spaced from the corresponding edge abutments 244a, b and 240a, b. The core components 232a–232r are shown spaced by slots 252a–252r, only certain of which are pictured. Such slots are of a widthwise extent equal to corresponding slots 246a–246r of member 231 as discussed above. Thus, the arcuate segment structuring represented in FIG. 11 is further defined.

Figure 12D:
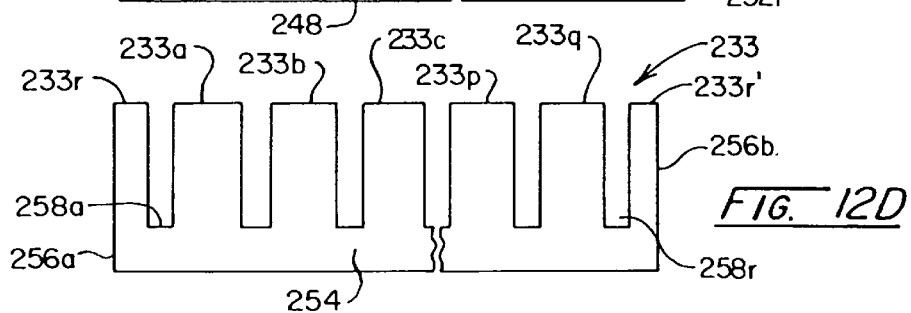

FIG. 12D shows the next inwardly disposed metal sheet member 233 is comprised of a core base 254 from which are provided upstanding integrally formed core elements 233a–233r. As before, only certain of these elements are shown in view of the larger number of core elements at hand. Core elements 233a–233r are provided having a widthwise extent slightly less than those shown at 232a–232r. Half element components 233r and 233r'are shown having upstanding outer edges 256a–256b which are brought together in abutting adjacency to form the next inwardly disposed core ring and are located away from the abutting edges of the other components 230–232. The spacing between upstanding core elements 233a–233r is such as to define slots 258a–258r having a widthwise dimension equal to the corresponding widthwise dimensions of slots 252a–252r of member 232 as discussed above.

The above sequence of sheet metal members continues through the 8 iterations required for a 8-piece laminar core structure. The above-discussed brushless PM d.c. motor architecture is one achieving desirable cost attributes for larger diameter devices. As the motors become smaller, for example, at diameters of 2 inches and below, then their topology may change while maintaining the important cost considerations permitting their use in the consumer oriented fields. Referring to FIG. 13, a smaller motor is shown in perspective fashion in general at 270. The base or support structure 272 of motor 270 is configured about a motor axis 274. Projecting outwardly from the base 272 is a motor shaft 276. A cylindrical side or housing 278 extends from the base 272 to a cylindrically-shaped polymeric cap 280 to complete the assembly. It may be noted that no exposed rotating rotor is in evidence at motor 270 as compared with motor 90.

Figure 15:
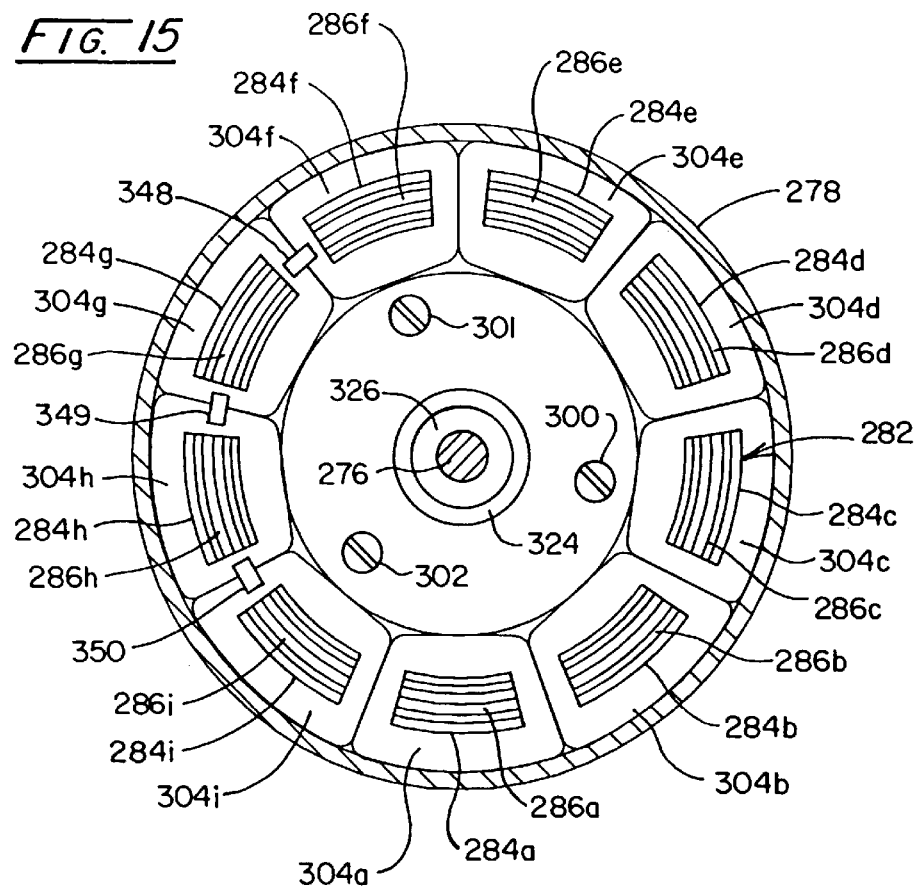
FIG. 15 is a sectional view taken through the plane 15—15 in FIG. 14.
Figure 16:
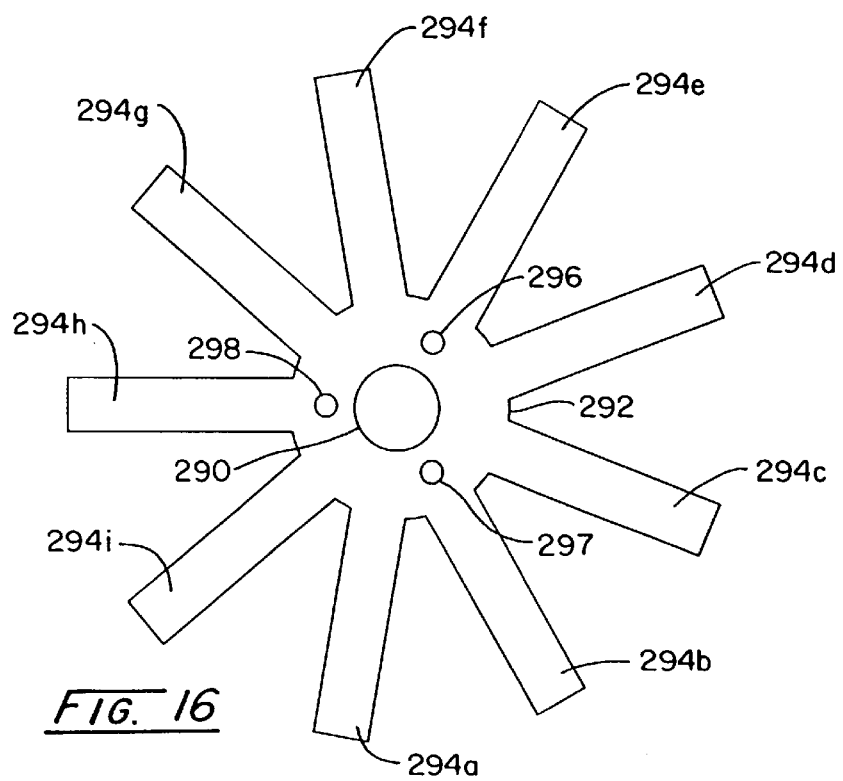
FIG. 16 is a plan view of a sheet metal component utilized in forming a core component for the motor of FIG. 14.

Looking to FIGS. 14 and 15, motor 270 is seen to have a stator assembly represented generally at 282 which provides nine upstanding stator components 284a–284i. Components 284a–284i are formed having laminar core components shown, respectively, at 286a, 286i, which are bent upwardly from a diameter base portion 288 further including a centrally disposed opening 290 which is centered about axis 274 and supported upon base 272. A plurality, for example seven laminations, are combined to form the core components 286a–i, and associated base 288. Looking momentarily to FIG. 16, one of the seven lamination blanks making up the core structure is revealed showing the circular opening 290, the periphery of the ring-shaped base 292, and the legs 294a–294i, for this laminar sheet prior to their being bent perpendicularly upwardly from the periphery 292. In assembly, seven of the lamination blanks, which are formed of a magnetically permeable material, typically covered with an insulative coating, are placed in a forming tool to achieve the structure required. Following such forming, the laminar sheets are assembled together to requisite dimensions and tolerances. It may be observed in FIG. 14 that variations in the length of the legs as at 294a–294i, need not be provided. In this regard, the core component 286c is seen to have a "stairstep" form at its tip. This serves to lower manufacturing costs. FIG. 16 additionally shows the presence of three holes 296–298. These holes are aligned upon the formation of the core structure and are used in conjunction with bolts or rivets to attach the structure to the base 272. Three such bolts are shown in FIG. 15 at 300–302. Upon completing the assembly of the core structure, field windings, which are positioned upon insulated bobbins, are placed over the core components 286a–286i. These bobbin and field winding assemblies are shown in FIG. 15 at 304a–304i, as associated with respective core components 286a–286i.

Returning to FIG. 14, it may be observed in connection with stator component 284c that its core 286c extends upwardly into a cavity 306c within polymeric cap 280, and is captured and supported therein as well as aligned thereby. Such an arrangement substantially facilitates the construction of motor 270 and assures the integrity of the position of the stator components 284a–284i, the core components of all of which are similarly retained and aligned. As shown in FIG. 14, a bearing support represented generally at 308 is seen to be connected to base 272. In this regard, the support 308 includes a downwardly depending first cylindrical portion 310 which nests within a corresponding opening 312 formed within base 272. A second cylindrical portion 314 of support 308 extends through the opening 316 of the assembled core components, and is retained against the bottom thereof as a sub-assembly by bent-up circular engaging tab 318. The upward portion of bearing support 308 is formed as a flange 320 having an annular receiving opening 322 which supports a bearing 324. Bearing 324, in turn, supports shaft 276 and is retained in position by adhesive attachment to the bearing support 308. A retainer ring 326 and spacer 328 locate the rotor shaft assembly between bearings 324 and 330.

The opposite end of shaft 276 is supported by a bearing 330 positioned within a bearing receiving opening 332 formed within polymeric cap 280. Bearing 330 is retained in position by adhesive attachment to cap 280. Spacers 336 are positioned intermediate the bearing 330 and rotor 334.

Rotor 334 is formed having a central portion of steel as at 338 which serves as the back iron for a ring-shaped permanent magnet component 340. Magnet 340 is formed, as before, of a relatively inexpensive and lower energy plastic bonded rare earth magnet material of, for example, about 10,000,000 Gauss Oersteds. Such a material typically is provided, for example as a neodymium iron boron material. For the nine stator pole arrangement, the magnet preferably is magnetized in six equal sectors with alternating polarities. The outwardly disposed flux interaction surface of magnet 340 confronts the upwardly extending flux interaction surface of the pole piece regions of core components 286a–286i, two such flux interaction regions being seen in FIG. 14 at 342c and 342h. These flux interaction surfaces of the stator pole pieces define a working air gap 344 with the outer flux interaction surface of magnet 340. The mid-point of this gap 344 is seen to be at a radius, $R_G$, from axis 274, while the corresponding outermost radius of motor 270 is shown at radius, $R_M$. As before, the field winding and bobbin assemblies extend upwardly along each core component a distance or stator winding height of about twice the corresponding pole height distance established at working air gap 344. To facilitate winding, as seen in FIG. 14, the polymeric, electrically insulative bobbins upon which the field windings are wound each incorporate a thickened region as seen, for example, at 346c and 346h, which provides a starting and ending for the winding procedure through the utilization of slots (not shown).

With the thus-described geometry, it may be observed that the sequence of components commencing with shaft 274 include, in order, rotor back iron; rotor magnet; working air gap; the stator pole piece flux interaction surface of the pole piece region; the pole piece, and the polymeric cap. With this geometry, the motor 270 exhibits an unusually high torque output notwithstanding the internal disposition of the radial gap 344. In this regard, motor 270 maintains a relatively high value for the ratio, $R_G/R_M$, for example having values of about 0.7 and above. Additionally, the design permits the development of a relatively small working gap 344 to provide a ratio, $L_m/L_g$, of value greater than about 3 with allowances made for flux leakage.

The motor 270 is particularly characterized in providing a working gap which is considered radial in that the sectors of ring magnet 344 are magnetized in the radial sense of the motor. However, the gap is disposed inwardly of the flux interaction surface of the core components. This facilitates the positioning of Hall effect position sensors. In this regard, the sensors may be positioned between the stator pole components to respond to the passage of the poles of the permanent magnet ring 340. Such sensors may be supported from the polymeric cap 280 and are seen in FIG. 14 as well as in FIG. 15 at 348–350.

Referring to FIG. 19, a partial sectional view of a variation of motor 90 described above in connection with FIGS. 4-8 is represented in general at 360. As in the case of motor 90, the motor variation 360 includes a base member 362 having an annular slot 364 within which is supportably inserted the multiple laminate ring type core assembly described in connection with FIGS. 11 and 12, and represented here generally at 366. A bobbin and field winding assembly as represented generally at 368 is positioned over the lower approximate two thirds of the upstanding core components. In the present embodiment, however, the pole piece region 370 provides two, oppositely disposed, flux interaction surfaces 372 and 374. Surfaces 372 and 374 are confronted by two corresponding multiple sector permanent magnets having a ring-shaped configuration 376 and 378 which are mounted upon rotor 380 and define, respectively, two oppositely disposed working air gaps 382 and 384. For the present embodiment, rotor 380 may, for example, be formed of steel so as to provide necessary back iron to the ring magnets 376 and 378. Alternately, separate steel rings can be carried by the rotor 380 behind each of the permanent magnet assemblies 376 and 378. As before, the magnetic sectors in permanent magnets 376 and 378 are magnetized or formed in a polar sense which is radial with respect to the axis of the motor 360. To support the two ring magnets 376 and 378, rotor 380 not only includes an outer supporting flange 386 similar to that shown at 104 in the case of motor 90, but also includes an inner supporting flange 388 depending downwardly from the interior surface of rotor 380. As is apparent, the provision of two of the working air gaps 372 and 374 will enhance the torque generating performance of the motor 360, however, with attendant costs. The two magnet ring, double radial gap, design has other salient advantages besides significantly increasing torque generating capability with only a minor increase in the motor dimensions.

One of those advantages relates to the forces that are present in the working gap of an energized pole in a motor. All motor designs generate force vectors in the working gap of the motor as a result of energized fields or a combination of energized and permanent magnet stored fields. The force vectors are three dimensional and can be represented by a rotating vector centered in the working gap of an energized pole of a motor. One component of the force vector is torque, and by use of sequential switching of the energized field elements, that component is controlled as the major component of the force vector. The other two components are an unbalance force acting to pull the rotor in a radial direction (inward or outward) and an axial component pulling the rotor in one direction or the other along its axis. This third component can be minimized by careful placement of the rotor within the stator's unwanted force vector. All standard motors normally cancel that component by providing a series of energized pole fields around the motor in sequential uniformly dispersed locations such that when summing all the energized poles, the torque vectors add and the element motor that would mean the phases are wound A, B, C, A, B, C, A, B, C in a progression around the motor such as that described in FIG. 3. Since the motor of the instant invention has the provision for two working gaps at each stator pole, the use of a double radial magnet design produces two force vectors, one at each working gap, at each energized pole. When summing the force vectors at each energized stator pole, the two torque vectors add and the two unbalance vectors subtract which substantially eliminates the unbalance component at that pole eliminating the need to provide other energized poles at other locations around the motor to provide a stable smooth running motor. This feature can not only give a smoother running motor but it makes possible the elimination of a number of the stator poles in an arc section of the motor making the stator less than a 360 degree component of the motor. This feature can be used by the product designer to design more compact motor systems and products or to adapt the motor into an unusual package because of product design requirements.

Another feature of the two magnet ring, double radial magnet design lies in the ability to place the pole components of one magnet ring slightly out of angular alignment with the corresponding pole components of the magnet ring located on the opposite side of the stator pole piece area. This feature is used to reduce or eliminate the traditional detent or cogging torque present in single annular working gap designs used in most all traditional brush and brushless motors and in single annular working gap designs of the present invention. In traditional P.M. D.C. motors, the rotor has preferred circumferential rest positions when the motor is not energized which result from preferred magnetic alignment of the permanent magnet poles to the ferromagnetic pole components. Therefore, there is a force or torque required to rotate the shaft of a de-energized motor. That torque is defined as the detent or cogging torque and if measured versus angular rotation, would inscribe a nearly sinusoidal torque waveform with both positive and negative torque values which could be described as clockwise and counterclockwise torque values. The average value is zero which occurs at the rest positions and at positions intermediate the rest positions.

The advent of rare earth magnet motors with their accompanying significantly higher magnet flux values has made the issue of detent torque far more significant. As noted earlier, the detent torque is added to or subtracted from the energized torque values which likely will create higher energized torque ripple, that is the peak value of torque to the minimum value, which usually occurs at the point of commutation. The magnitude of torque ripple can be detrimental to motor performance in many applications, especially at low load values and low speeds. Since the two magnet ring version of the motor of the instant invention has two radially disposed air gaps of nearly equal radial distance from the axis of the motor, the motor could be considered to be two motors in one and by using that criteria, the detent torque characteristic of each motor element, meaning the motor characteristic due to each radial gap, can be analyzed individually, although there is interaction between the two magnet rings. Normally each magnet ring would be aligned angularly with the north magnetized pole element of the other magnet ring and conversely the south magnetized pole element of one ring would face the south magnetized pole element of the other ring. Under these conditions the detent torque characteristic curve values of one more element, say due to the outside of the two radial gaps, would be in angular phase with the detent torque characteristic curve values of the other motor element, meaning due to the inner of the two radial gaps, and therefore, the torque values would directly add giving a combined motor with approximately twice the magnitude of detent torque as was present in each of the individual detent torque characteristic curves due to each of the two radial air gaps. The same would be true of the energized torque characteristic curves due to each radial gap.

Since the magnet ring pole elements are directly facing one another, the two magnet rings are trying to knock each other down or demagnetize each other and, therefore, the combined magnet load line will be slightly lower than what would be the magnet operating load line of each magnet ring individually. This means the resultant detent an energized torque values will not be exactly twice what the values would be if each motor were measured alone, meaning with only the inside or outside permanent magnet ring present.

If the inner permanent magnet ring was angularly misaligned from the outer permanent magnet ring by an amount that would create a 180 degree phase shift in the detent torque characteristic curve from one motor element to the other, then the sum of the two curves would approximate zero. In a typical three phase brushless motor with six ferromagnetic stator pole components and eight rotor permanent pole elements, the motor would have 24 cycles of detent torque in one revolution and four cycles of energized torque in one revolution. Since there are six cycles of detent torque for one cycle of energized torque, the amount of offset that would be necessary to almost eliminate detent torque would be small, in this case only a 7.5 degree angular shift. The effect on the energized torque would only be to reduce it by about 4% and with almost a 100% reduction in detent torque, the result can be a motor characteristic that is very advantageous for many applications.

Other methods are available in conventional motor designs with ferrous pole components to reduce the value of detent torque. Some of these are to skew the lamination stack with a rotational twist from one end of the stack to the other, therefore skewing the ferrous pole component or to skew the magnetizing of the permanent magnet pole elements in the same manner. These methods also reduce the value of energized torque and can significantly reduce the manufacturability of the rotor. Another method is to use a select number of rotor pole elements for a given number of stator pole components that will create equally angularly displaced detent torque characteristic curves for each stator pole component such that the summation of all detent torque characteristic curves results in a zero summation. For instance, a rotor/stator pair combination which would give this characteristic is an eight pole element rotor with a nine pole component stator. This also results in a decrease in the value of energized torque and because the distribution of individual phase stator pole components is not uniformly dispersed around the motor the unbalance force vector component defined earlier is not cancelled when summed around the motor as would be with conventional rotor/stator pole element pairs. In this three-phase nine stator pole element motor that would mean the phases are would A, A, A, B, B, B, C, C, C in a progression around the motor which will not result in the desired cancellation of the radial unbalance force vector components when energizing any two phases.

Figure 20:
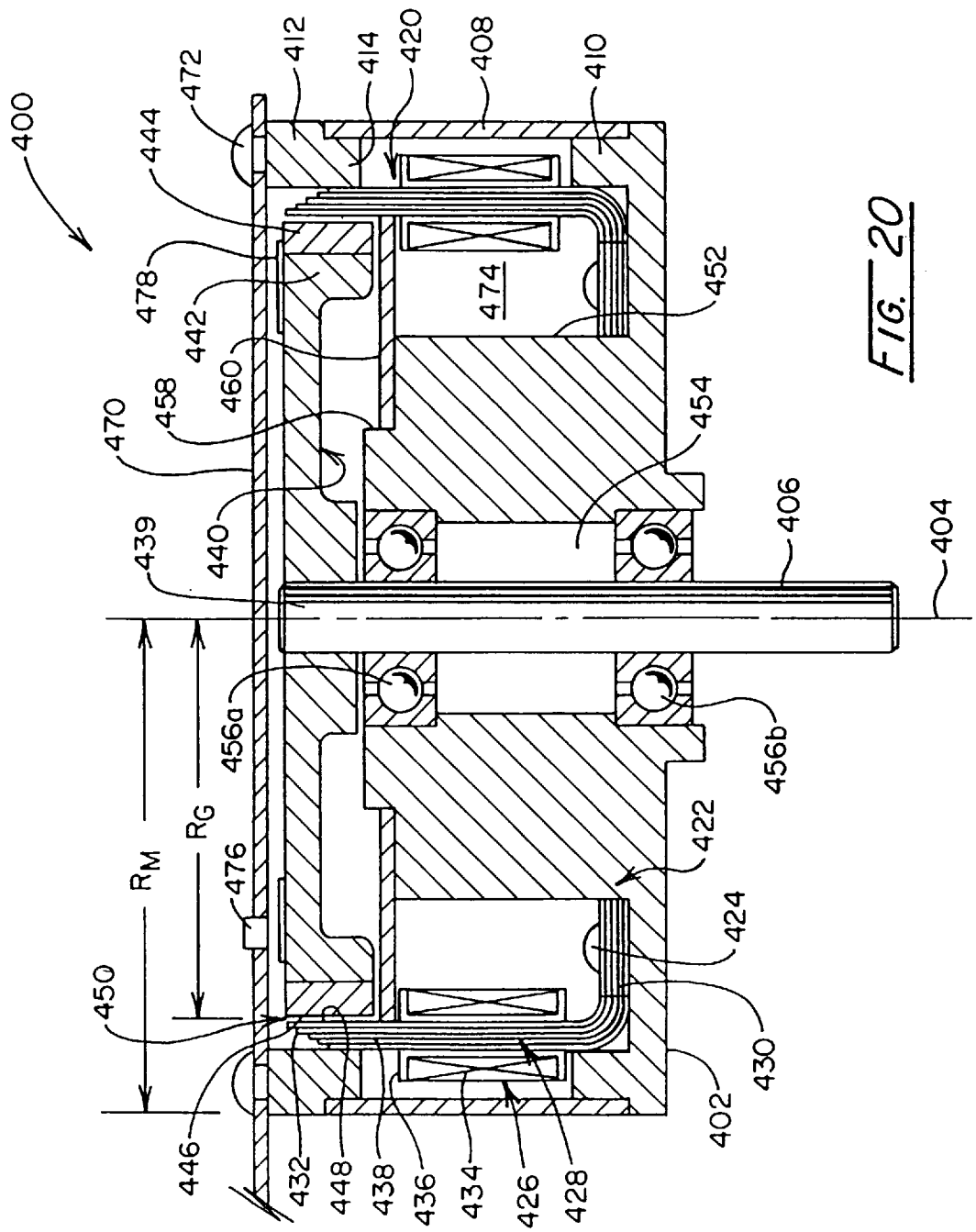
FIG. 20 is a sectional view of another motor structured in accordance with the invention.

Looking next to FIG. 20 an alternative embodiment of an inner radial gap motor according to the present invention is shown in cross-section generally at 400. As before, the base or supporting structure 402 of motor 400 is configured about a motor axis 404, with a motor shaft 406 projecting outwardly from base 402. For ease of assembly, a separate, generally cylindrical side housing 408 is provided to extend from base 402 about a flanged portion, 410, thereof, to a generally annular clamp, 412. Preferably, clamp 412 is formed of a plastic or other polymeric material or the like. Side housing 408 is received about a corresponding flanged portion, 414, of clamp 412 to form an inherently rigid arrangement with clamp 412 and base 402.

A stator assembly, represented generally at 420, which includes a centrally disposed opening, represented at 422, is coaxially aligned with shaft 406 about motor axis 404. Stator assembly 420 is supported upon base 402, and may be removably attached thereto with a number of fasteners or the like, one of which is shown at 424. As before, stator assembly 420 is constructed as having a plurality of upstanding stator components, one of which is shown at 426. Each of stator components 426 is formed as having a laminar core component, one of which is shown at 428, which is bent upwardly from a diameter base portion 430. A plurality of, for example, five laminations are combined to form the core components 428 and associated base 430. Alternatively, however, stator assembly 420 may be provided as having the generally annular configuration described in connection with FIGS. 11 and 12.

As was described in connection with FIG. 16, the five lamination blanks making up the core structure of stator assembly 420, each of which laminations are formed of a magnetically permeable material typically covered with an insulative coating, are placed in a forming tool to achieve the structure required. Following such forming, the laminar sheets are assembled together to requisite dimensions and tolerances. Again, and as was observed in FIG. 14, variations in the length of the legs forming the core components need not be provided as each such components may be utilized with the "stairstep" profile shown at tip 432 of core component 428. Upon completing the assembly of the core structure, field windings, one of which is shown at 434, are positioned upon insulated bobbins, 436, which, in turn, are placed over each core component 426, a pole piece region 438 thereof extending to tip 432.

Mounted onto an end 439 of shaft 406 is a rotor, shown generally at 440 to include a central portion of steel as at 442 which serves as the back iron for a ring-shaped permanent magnet component 444. Magnet 444 is formed, as before, of a relatively inexpensive and lower energy plastic bonded rare earth magnet material of, for example, about 10,000,000 Gauss Oersteds. Such a material typically may be provided as a neodymium iron boron material. For an arrangement of, for example, nine stator poles, the magnet preferably is magnetized in six equal sectors with alternating polarities. For each of stator core components 428, the outwardly disposed flux interaction surface 446 of magnet 444 confronts a corresponding, upwardly extending stator pole flux interaction surface, one such surface being shown at 448 for stator pole piece region 438, to define a generally radial working air gap as is represented at 450. Again, the midpoint of this gap 450 is seen to be at radius $R_G$ from axis 404, while the corresponding outermost radius of motor 400 is shown at radius $R_M$. As before, the field winding 434 and bobbin 436 assemblies extend upwardly along each core component 428 at a distance or stator winding height of about twice the corresponding height of pole piece region 438 established at working air gap 450.

Advantageously, base 402 may be integrally-formed with an upstanding, generally annular region, 452, which is received by opening 422 of stator base 430. Annular region 452 extends coaxially with motor axis 406 toward rotor 440 to define a generally cylindrical cavity, represented at 454, receiving shaft 404 and its associated bearings, 456a and 456b, which may be of a sleeve-type. Annular region 452 additionally defines at its terminal end an upstanding shoulder portion, 458, which is spaced-apart from rotor 440. Shoulder portion 458 is configured to receive a generally annular stator support, 460, which extends radially outwardly therefrom to an abutting adjacency with each of stator core components 428 generally at pole pieces 438 thereof. It will be appreciated that such abutment is effective to maintain pole pieces 438 at a predetermined reference position relative to magnet 444 defining working air gap 450. In this regard, the described arrangement ensures the integrity of the gap distance in countering the attraction between magnet 444 and pole pieces 438.

Motor 400 also includes a circuit board, 470, which is mounted to base 402 via clamp 412 and a number of fasteners, one of which is shown at 472. Circuit board 470 defines with base 402 and side housing 408 an internal chamber, shown at 474, receiving stator assembly 420 and rotor 440. Advantageously, the location of circuit board 470 in the arrangement shown covers the rotating rotor 440 such that no portion thereof is exposed, and facilitates the disposition in adjacency with rotor 440 of any number of board-mounted sensors, one of which is shown at 476. Sensor 476 may be provided as a Hall-effect type to be magnetically responsive to the rotation of rotor 440 and magnet 444 to provide output signals corresponding to the instantaneous rotational position of rotor 440. Also, as was previously demonstrated, with motor 270 of FIG. 14, it is apparent that the Hall effect sensor location in motor 270 is consistent with a board-mounted sensor for motor 400. These output signals may be supplied to associated control circuitry (not shown) additionally carried in an integrated fashion by board 470 for effecting the selective excitation of stator windings 434 in correspondence therewith. Alternatively, as shown, sensors 476 may be provided as of a type which is optically responsive to a reflective indexing indicia, 478, disposed on rotor 440 at a spaced-apart distance from motor axis 404.

With the geometry of motor 400 as thus described, it may be observed that the sequence of components commencing with shaft 406 include, in order: rotor back iron 442; rotor magnet 444; magnet flux interaction surface 446 thereof; working air gap 450; pole piece flux interaction surface 448; pole piece 438; and clamp 412. As a result of such geometry, motor 400 has been observed to exhibit an unusually high torque output notwithstanding the internal, radial disposition of work air gap 450. That is, motor 400 nevertheless maintains a relatively high value of, for example, at least about 0.7 for the ratio $R_G/R_M$. The described design additionally leads to the development of a relatively small working gap 450 providing a ratio $L_m/L_g$ of value greater than about 3 with allowances made for flux leakage.

Figure 21:
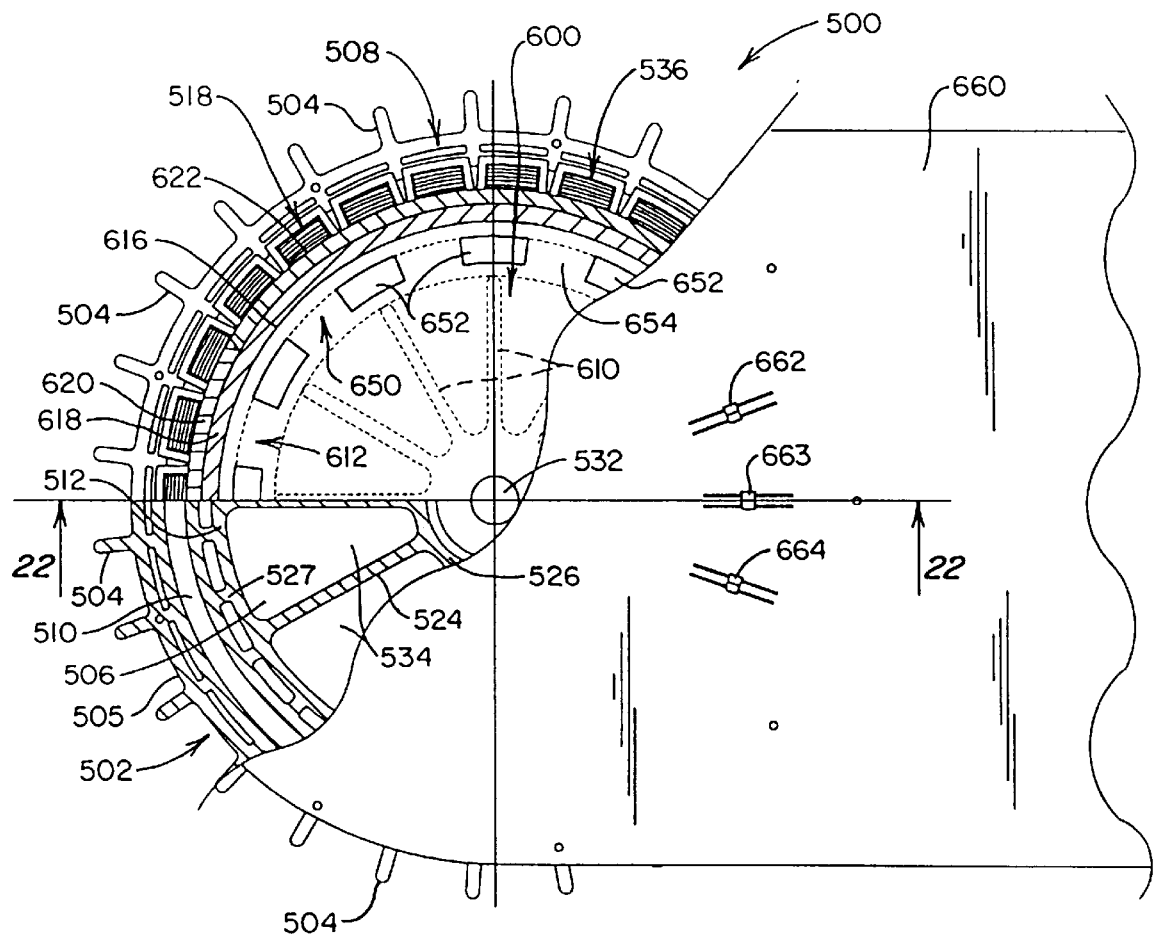
FIG. 21 is a top view of another motor structured in accordance with the invention with portions broken away to reveal internal structure.
Figure 22:
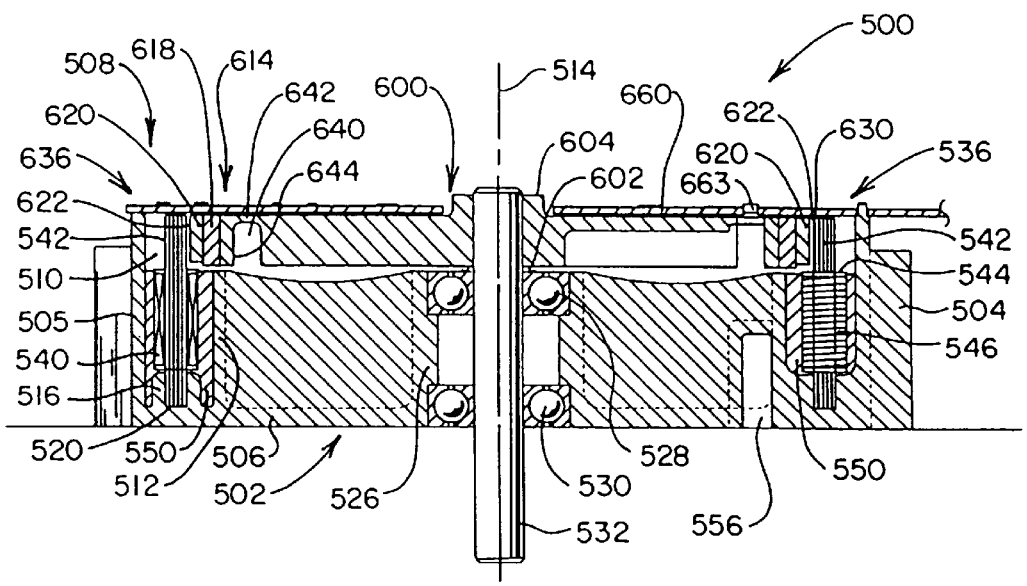
FIG. 22 is a sectional view of the motor shown in FIG. 21 taken through the plane 22—22 therein.

Referring to FIGS. 21 and 22, another embodiment of a motor structured according to the invention is revealed. This motor is of a "larger" variety, typically being implemented, for example, with a topology creating a diameter of between about 4 and 5 inches, and a thickness of between 1 and 2 inches. The principal components of base and rotor preferably are injection molded or die cast to reduce costs, such molding being carried out with materials such as a rigid plastic or aluminum. Where plastic materials are employed, such materials should be structurally rigid. For example, a thermoplastic polyester resin marketed under the trademark RYNITE by DuPont de Nemours Corporation may be employed. This resin is available in unreinforced and reinforced versions, the latter containing uniformly dispersed short glass fibers. FIG. 21 shows the motor 500 in general as including a base 502 having heat dissipating fins, certain of which are identified at 504. FIG. 22 also shows that these fins are integrally molded with and extend outwardly from an outer integral wall 505 which is relatively thin and is integrally formed in conjunction with a base portion 506 as seen more clearly in FIG. 22. FIG. 22 also shows that the inner wall 512 is integrally formed in conjunction with the base portion 506 and emanates from an inner reinforcing ring represented generally at 527. The wall 505 at mounting portion 508 forms the outward component of mounting cavity 510 with wall 512 forming the inner component, these components being seen more clearly in FIG. 22. Cavity 510 extends in a circular locus positioned radially outwardly from the motor axis 514 (FIG. 22) and is configured having an upstanding annular mounting ridge 516 which receives a circular stator assembly represented generally at 518. Stator assembly 518 is configured in the manner described in connection with FIGS. 11 and 12 above, the ring-shaped base support portion earlier described at 118 now being seen at 520 in FIG. 22 nesting within a slot within ridge 516. Ribs as 524 extend from inner wall 512 to a bearing support region 526 within which bearings 528 and 530 are mounted to support rotating shaft or axle 532. It may be observed in FIG. 21 that the rib structures 524 also define a sequence of open cavities, two of which are seen at 534 which extend to the bottom portion 506. With the present embodiment, 27 upstanding, spaced apart core components, some of which are represented generally at 536 are provided. The 27 core components of the instant embodiment are arranged in conjunction with the noted circular locus of mounting cavity 510. As before, each has a winding association region as seen in FIG. 22 at 540, which extends within the cavity 510 and a pole piece region seen in FIG. 22 at 542 extending upwardly therefrom a pole height distance with an inwardly disposed flux interaction surface. Each core component 536 also, as before, includes a bobbin, one of which is identified at 544 in FIG. 22. These bobbins as at 544 may be formed of the earlier-described thermoplastic polyester resin. The bobbins 544 are wound with a field winding as seen in FIG. 22 at 546. Of particular note in connection with the present embodiment, the core components and stator windings with bobbins are stabilized with an electrically insulative, thermally conductive potting material seen in FIG. 22 at 550, along, for example, the extent of the winding association region 540. This potting material may be provided, for example, as a low viscosity, two-component epoxy potting and encapsulating system marketed under the trade designation "EPOCAP 19284" by Harcros Chemicals, Inc. of Belleville, N.J. 07109. By so potting the portion of the stator assembly below the pole piece region 542, an improved stability of the stator assembly is achieved such that it better withstands the magnetic forces and the like necessarily encountered. Of course, improvements in overall motor integrity in terms of structure and stability are developed with this arrangement. Mounting holes for the motor 500 are provided, one of which is seen in FIG. 22 at 556.

The rotor of motor 500 as represented generally at 600 is of generally thin, cylindrical configuration, as before, being formed preferably via molding techniques. Rotor 600 is mounted upon axle 532 for rotation about axis 514, such mounting including a spacer present as a wavy washer 602 as seen in FIG. 22 and an upper mounting region 604. The rotor is formed incorporating stiffening or reinforcing ribs, certain of which are revealed at 610 in FIG. 21. That figure also shows that the ribs extend to a ring-shaped peripheral support region represented at 612. This region 612 extends to an outer cylindrical magnet support portion represented generally at 614 which includes an outwardly-disposed cylindrically shaped surface 616. Surface 616, in turn, is connected with a ring-shaped back iron component 618 which is continuous and contributes to the structural integrity of the rotor 600. The outward surface of back iron 618 functions to support a permanent magnet assembly incorporating alternating polarity segments as represented at 620. The outwardly disposed cylindrical face 622 of permanent magnet structure or assembly 620 provides a flux interaction surface generally parallel with the motor axis 514 which is coextensive and in adjacency with the corresponding flux interaction surface of the stator assembly to define a gap as seen at 630 in FIG. 22.

For many applications, it is desirable to enhance the quiet running characteristics of motors as at 500. Such acoustic noise diminution is developed with the instant embodiment by an arrangement isolating the axial strain imposed upon rotor 600 by axially directed magnetic force vectors to a region adjacent the mounting portion 614. In this regard, the rotor magnet support portion 614 is configured to exhibit a stiffness to forces imposed radially with respect to axis 514 and a flexibility to those lesser vector forces which may be generated vertically or in parallel relationship with axis 514. This restricts noise inducing vibrations to the very outward portion of the rotor 600. In effect, the rotor flexes at its tip very slightly with the imposition of vertical force magnetically induced vectors. To provide this, the rotor magnet support portion 614 is configured having an annular cavity seen in FIG. 22 at 640. This cavity 640 extends to an annular bridge portion 642 having a thickness which permits a very slight flexure along directions parallel to axis 514 but exhibiting high stiffness radially from that axis. The tendency for the outer wall 644 of cavity 640 to bend inwardly or outwardly is offset by the rigid support to its outer surface supplied by the ring-shaped back iron 618 which is a continuous component.

FIG. 21 further reveals that the annular bridge 642 at outer portion 650 of rotor 600 is formed having a sequence of openings as at 652 which extend along a generally circular locus and between which are located radiation reflection surfaces, certain of which are represented at 654. These openings 652 and intermediately disposed reflective surfaces 654 function as part of an arrangement developing rotor position signals for carrying out appropriately synchronized commutation. The motor 500 is enclosed at its top portion by a top support which, advantageously, may serve as a printed circuit support for motor control purposes. As part of this motor control feature, the arrangement of this embodiment incorporates reflective switches or optical sensors (such as in motor 400 at 476 and shown here) as at 662–664 which are located over the locus of opening 652 and reflective surfaces 654. FIG. 22 shows that the positioning of these sensors 662–664 (component 663 being revealed) is such that they are closely adjacent the top surface of rotor 600. With the arrangement shown, radiation from an infrared transmitter is directed downwardly upon the rotor 600 where it is either reflected by the surfaces 654 or not reflected at all by virtue of the presence of the hole 652 being positioned thereof. This provides two conditions which readily are related to rotor position. The reflective switches may be provided, for example, as a type MTRS9080 infrared LED and phototransistor marketed by Marktech, Inc. of Menand, N.Y. 12204.

All motors of the current featured invention can have their torque generating capabilities increased by increasing the surface area of the pole piece region that confronts the permanent magnet pole elements of the rotor permanent magnet assembly. For a given number of stator pole components, this would normally be accomplished by making the stator pole piece component as angularly wide as possible to confront as much of the rotor magnet pole elements as possible and still leave room for the field winding supported on a bobbin to be inserted over each stator pole core component and not interfere with the adjacent field winding. Further increases in stator pole surface area would then normally be accomplished by increasing the height of the pole piece region along with a corresponding increase in the height of the rotor permanent magnet pole elements.

Another method to gain stator pole piece region surface area without increasing the height of the pole piece region and therefore increase the torque generating capabilities of the motor without increasing overall package size is to extend the angular width of the stator pole piece region without a corresponding increase in the angular width in the winding association region. This flared pole piece region gives greater stator pole piece area and increased interaction with the rotor permanent magnet pole elements and also reduces the gap between adjacent stator poles which further enhances the energized field flux flow in the desired area between adjacent stator poles. The result is enhanced torque production capability with the same number of stator pole elements and without increasing the overall height of the motor or increasing the height of the rotor permanent magnet pole elements.

The disadvantage of this motor torque enhancement feature is that the motor field windings can no longer be would on remote bobbins which later in the assembly process can be inserted over the stator pole core element. The winding of the more field windings must now be carried out in a more conventional fashion directly over previously insulated stator pole core components as would be done in conventional motors with flared pole tips. Even though winding of the motor would be carried out in this manner, the winding procedure would be substantially easier than the winding of individual stator pole core components in a conventional brushless motor with inward facing stator pole core components.

As it is anticipated that certain changes may be made in the present invention without departing from the precepts herein involved, it is intended that all matter contained in the foregoing description or shown in the accompanying drawings shall be interpreted as illustrative and not in a limiting sense.

I claim:

1. A d.c. motor comprising:
   a base structure having a stator assembly mounting portion;
   a stator assembly including a plurality of longitudinal, spaced apart ferromagnetic core components supported at said mounting portion, each said core component having a height along its longitudinal extent and includes a winding association region and a pole piece region extending therefrom a defined pole height distance with a first inner radiused flux interaction surface and a first outer radiused flux interaction surface spaced radially outwardly therefrom and a field winding extending around said core component at said winding association region to define a stator winding of stator winding height located below said pole piece region, said core components being arranged in mutually spaced adjacency about a circular locus spaced from a motor axis, said stator windings being selectively excitable to generate an energized magnetic field at select said pole piece regions;

a rotor, rotatable about said motor axis;

a radially magnetized permanent magnet assembly, including a magnet component containing a sequence of alternating magnetic poles, and generally configured in ring-like fashion, supported by said rotor for rotation about said motor axis, having a second flux interaction surface parallel with said motor axis, generally coextensive with said defined pole height distance of each said pole piece region and in adjacency with a said first flux interaction surface, and selectively magnetized to define magnetic pole segments having alternately occurring north and south pole components; and said first and second flux interaction surfaces being radially spaced apart a distance to permit movement of said rotor and effective to create interaction between the field of the permanent magnet assembly and the energized magnetic field of said stator windings present at said pole piece regions.

2. The d.c. motor of claim 1 in which:

each said core component is formed of mutually radially adjacent sheet metal laminations each having inner and outer radial surfaces extending to a tip;

said first flux interaction surface is provided as a said metal lamination radial surface.

3. The d.c. motor of claim 1 in which said pole height distance is about one-half or less of said stator winding height.

4. The d.c. motor of claim 1 in which said permanent magnet assembly magnet component is positioned upon said rotor to locate said second flux interaction surface to face radially outwardly toward said first inner radiused flux interaction surface.

5. The d.c. motor of claim 1 in which said permanent magnet assembly magnet component is positioned upon said rotor to locate said second flux interaction surface to face radially inwardly toward said first outer radiused flux interaction surface.

6. The d.c. motor of claim 1 in which each of said ferromagnetic core components is formed of processed ferromagnetic particles.

7. The d.c. motor of claim 1 including a housing component positioned adjacent said rotor, connected with said base structure, and configured to support said stator assembly core components at said pole piece region.

8. The d.c. motor of claim 1 in which:

said permanent magnet assembly includes a first said magnet component having a said second flux interaction surface coextensive and in adjacency with said first inner radiused flux interaction surface; and said permanent magnet assembly includes a second magnet component having a third flux interaction surface coextensive and in adjacency with said first outer radiused flux interaction surface.

9. The d.c. motor of claim 8 in which:

said magnetic poles of said first magnet component are in substantial facing alignment with said magnetic poles of like polarity of said second magnet component.

10. The d.c. motor of claim 9 in which:

each said magnetic pole of said first magnet component is set in facing alignment but angularly displaced with said magnetic pole of like polarity of said second magnet component an amount effective to reduce the detent or cogging forces due to polar attraction.

11. The d.c. motor of claim 1 including:

a circuit board mounted to said base structure to define therewith an internal chamber receiving said stator assembly and said rotor; and at least one sensor mounted to said circuit board in adjacency with said rotor, said sensor being responsive to the rotation of said rotor to provide output signals corresponding to the instantaneous rotational position of said rotor for selectively exciting the phases of said stator windings in correspondence therewith.

12. The d.c. motor of claim 11 wherein said sensor is magnetically responsive to said magnetic component to provide said output signals.

13. The d.c. motor of claim 11 including a reflective indicia disposed on said rotor a spaced-apart distance from said motor axis, said sensor being optically responsive to said indicia to provide said output signals.

14. The d.c. motor of claim 1 in which:

said base structure extends within said stator core components axially along said motor axis to define an upstanding shoulder portion spaced-apart from said rotor; and including a generally annular stator support aligned coaxially with said motor axis, said stator support being supported on said shoulder portion and extending radially outwardly therefrom to an abutting adjacency with each of said stator core components maintaining each said pole piece region thereof at a predetermined reference position relative to said permanent magnet assembly.

15. The d.c. motor of claim 1 in which said rotor includes a magnetically permeable component supported by said rotor and positioned in direct contact with said radially magnetized permanent magnet assembly opposite said second flux interaction surface.

16. The d.c. motor of claim 1 in which:

the circumferentially defined gap between adjacent said core components along said pole height distance has a circumferential extent that is greater between adjacent said first inner radiused surfaces than between corresponding said first outer radiused surfaces.

17. The d.c. motor of claim 1 in which:

the circumferentially defined gap between adjacent said core components along said pole height distance has a circumferential extent that is greater between adjacent said first inner radiused surfaces than between corresponding said first outer radiused surfaces.

18. The d.c. motor of claim 1 in which said ferromagnetic core components are coupled in magnetic field communicating association at said mounting portion.

19. The d.c. motor of claim 1 in which said rotor includes:

a bearing structure for supporting said rotor for rotation about said motor axis; and said bearing structure is supported by said base structure and is located only at one axially disposed side of said rotor supported radially magnetized permanent magnet assembly.

20. The d.c. motor of claim 1 in which the widthwise extent along said circular locus of said stator core component at said pole piece region is greater than the corresponding widthwise extent of said stator core component at said winding association region.

* * * * *